US011547975B2

(12) United States Patent
Savino

(10) Patent No.: US 11,547,975 B2
(45) Date of Patent: Jan. 10, 2023

(54) SYSTEM AND METHOD FOR DISPENSING A BEVERAGE

(71) Applicant: Plant Tap, LLC, North Salem, NY (US)

(72) Inventor: Joseph Camillo Savino, North Salem, NY (US)

(73) Assignee: Plant Tap, Inc., Brewster, NY (US)

(*) Notice: Subject to any disclaimer, the term of this patent is extended or adjusted under 35 U.S.C. 154(b) by 240 days.

(21) Appl. No.: 16/782,046

(22) Filed: Feb. 4, 2020

(65) Prior Publication Data

US 2020/0254409 A1 Aug. 13, 2020

Related U.S. Application Data

(63) Continuation-in-part of application No. 16/409,759, filed on May 10, 2019.

(Continued)

(51) Int. Cl.
*B01F 35/00* (2022.01)
*B01F 35/83* (2022.01)
(Continued)

(52) U.S. Cl.
CPC ............ *B01F 35/832* (2022.01); *A23C 11/02* (2013.01); *B01F 23/47* (2022.01); *B01F 35/92* (2022.01);
(Continued)

(58) Field of Classification Search
CPC .... A23C 11/02; B01F 2101/14; B01F 35/832; B01F 23/47; B01F 35/92; B01F 23/471; B01F 2035/98
See application file for complete search history.

(56) References Cited

U.S. PATENT DOCUMENTS 2,614,738 A 10/1952 Mills
3,251,550 A 5/1966 Axel et al.
(Continued)

FOREIGN PATENT DOCUMENTS

CN 104782773 A 7/2006
CN 104799281 A 7/2006
(Continued)

OTHER PUBLICATIONS

Nut Milk Wet Blending Machines, Aug. 15, 2016, https://www.alibaba.com/product-detail/nut-milk-wet-blending-machines_60465570199.html?spm=a2700.7724857.0.0.Pd0spa.

*Primary Examiner* — Anshu Bhatia
(74) *Attorney, Agent, or Firm* — Finnegan, Henderson, Farabow, Garrett & Dunner L.L.P.

(57) ABSTRACT

A system for dispensing a plant-based milk includes a mixing chamber for emulsifying a plant-based paste and water, a plant-based paste storage connected to the mixing chamber via a first conduit, a water storage connected to the mixing chamber via a second conduit, and a cooling system. The system includes a pumping system for moving a prescribed amount of the plant-based paste into the mixing chamber upon receiving an input from a user via a user interface, a flow system for flowing water from the water storage to the mixing chamber, and a control system. The control system receives the input from the user, activates the pumping system and activates the flow system. Further, the control system activates the mixing chamber for emulsifying the plant-based paste and the water, and dispenses the emulsified plant-based mixture of the paste and the water.

20 Claims, 19 Drawing Sheets

Related U.S. Application Data

(60) Provisional application No. 62/821,644, filed on Mar. 21, 2019, provisional application No. 62/802,693, filed on Feb. 7, 2019.

(51) Int. Cl.
   *A23C 11/02* (2006.01)
   *B01F 23/47* (2022.01)
   *B01F 35/92* (2022.01)
   B01F 35/90 (2022.01)
   B01F 101/14 (2022.01)

(52) U.S. Cl.
   CPC ......... *B01F 23/471* (2022.01); *B01F 2035/98* (2022.01); *B01F 2101/14* (2022.01)

(56) References Cited

U.S. PATENT DOCUMENTS

| | | |
|---|---|---|
| 3,542,342 A | 11/1970 | Barron |
| 3,857,977 A | 12/1974 | Huessy |
| 4,121,301 A | 10/1978 | De Francisci |
| 4,595,131 A | 6/1986 | Ruskin et al. |
| 4,643,906 A | 2/1987 | Pitz |
| 4,744,992 A | 5/1988 | Mitchell et al. |
| 4,759,472 A | 7/1988 | Stenger |
| 4,800,097 A | 1/1989 | Morris et al. |
| 4,871,373 A | 10/1989 | Kiener et al. |
| 4,894,242 A | 1/1990 | Mitchell et al. |
| 5,018,646 A | 5/1991 | Billman et al. |
| 5,312,020 A | 5/1994 | Frei |
| 5,899,563 A | 5/1999 | Karras |
| 5,918,768 A | 7/1999 | Ford |
| 5,927,553 A | 7/1999 | Ford |
| 5,975,357 A | 11/1999 | Topar |
| 5,975,365 A | 11/1999 | Hsieh |
| 6,007,236 A | 12/1999 | Maguire |
| 6,123,976 A | 9/2000 | Stoddard |
| 6,153,247 A * | 11/2000 | Stoddard ............... A23G 1/56 426/598 |
| 6,293,693 B1 | 9/2001 | Rodgers et al. |
| 6,419,120 B1 | 7/2002 | Bertone |
| 6,428,828 B1 | 8/2002 | Jackson et al. |
| 6,485,773 B1 | 11/2002 | Myers |
| 6,550,648 B2 | 4/2003 | Bardin |
| 6,553,779 B1 | 4/2003 | Boyer et al. |
| 6,874,660 B2 | 4/2005 | Bertone |
| 7,036,687 B1 | 5/2006 | Lowe |
| 7,368,140 B2 | 5/2008 | Tabata |
| 7,829,128 B2 | 11/2010 | Karwowski et al. |
| 8,333,301 B2 | 12/2012 | Majer |
| 8,695,483 B2 | 4/2014 | Koopman et al. |
| 2003/0230604 A1 | 12/2003 | Huffer |
| 2004/0035884 A1 | 2/2004 | de la Guardia |
| 2006/0157602 A1 | 7/2006 | Wang |
| 2006/0209624 A1 | 9/2006 | Hoogland |
| 2006/0249535 A1 | 11/2006 | Mauger et al. |
| 2007/0026128 A1 | 2/2007 | Jarrett |
| 2007/0128335 A1 | 6/2007 | Iwamoto et al. |
| 2007/0148318 A1 | 6/2007 | Rubio et al. |
| 2009/0236361 A1 | 9/2009 | Doelman et al. |
| 2011/0064862 A1 | 3/2011 | McCready |
| 2011/0086158 A1 | 4/2011 | Aremu et al. |
| 2012/0037660 A1 | 2/2012 | Bacellar et al. |
| 2013/0062366 A1 | 3/2013 | Tansey |
| 2013/0258799 A1 | 10/2013 | Christy et al. |
| 2014/0175124 A1 | 6/2014 | Nathan |
| 2014/0193563 A1 | 7/2014 | Carder et al. |
| 2014/0197202 A1 | 7/2014 | Soh et al. |
| 2015/0043302 A1* | 2/2015 | Kamiya ............... B01F 35/8311 366/152.1 |
| 2015/0366254 A1 | 12/2015 | Kesier et al. |
| 2016/0114297 A1* | 4/2016 | Perez .................. B01F 23/702 366/182.2 |
| 2016/0338389 A1 | 11/2016 | Malone et al. |
| 2018/0035841 A1 | 2/2018 | Savino |

FOREIGN PATENT DOCUMENTS

| | | |
|---|---|---|
| CN | 201044718 Y | 4/2008 |
| CN | 191861894 B | 8/2012 |
| CN | 102836667 A | 12/2012 |
| CN | 103636804 A | 3/2014 |
| CN | 104286185 A | 1/2015 |
| CN | 104304480 A | 1/2015 |
| CN | 104397182 A | 3/2015 |
| CN | 104489103 A | 4/2015 |
| WO | WO 2006/128561 A1 | 12/2006 |
| WO | WO-2013/078510 A1 | 6/2013 |

* cited by examiner

| 662 | Base Temperature Sensor | 668 | Level Sensor in Mixing Chamber |
| --- | --- | --- | --- |
| 664 | Mixing Chamber Temperature Sensor | 230 | Valve for Dispensing Plant-Based Milk to Bottle |
| 666 | Water Tank Temperature Sensor | 676 | Valve to Reduce Pressure in Mixing Chamber |
| 670 | Base Inflow Valve | 680 | Pressure Sensor in Mixing Chamber |
| 672 | Water Inflow Valve | 144 | Mixing Motor |
| 165 | Scale System | 686 | Cleaning Valve |

SYSTEM AND METHOD FOR DISPENSING A BEVERAGE

CROSS-REFERENCE TO RELATED APPLICATIONS

This application claims priority of U.S. Provisional Patent Application Ser. No. 62/802,693 entitled "Food and Beverage Product Mixing and Dispensing Machine," filed Feb. 7, 2019, U.S. Provisional Patent Application Ser. No. 62/821,644 entitled "Food and Beverage Product," filed Mar. 21, 2019, U.S. patent application Ser. No. 16/409,759 entitled "Food and Beverage Product," filed May 10, 2019, and International Patent Application No. PCT/US2019/031884, entitled "Food and Beverage Product," filed May 10, 2019, the disclosures of which are expressly incorporated by reference herein in their entireties for all purposes.

TECHNICAL FIELD

The present disclosure relates to a system and method for forming a food and beverage product and more particularly, to a nut-based or grain-based food and beverage product.

BACKGROUND

In recent years, consumption of plant-based or non-dairy milk alternatives has significantly increased. Nowadays, cow milk allergy, lactose intolerance, calorie concern, and preference for vegan diets have influenced consumers towards choosing cow milk alternatives. Additionally, people may prefer non-dairy alternatives due to concerns over saturated fat levels, hormone content, environmental impact from animal produced methane and antibiotic use in dairy cattle. Plant-based beverages may be derived, for example, from soy, various nuts, or grains. Many retail plant-based products (e.g., almond milk, cashew milk, etc.), have numerous synthetic ingredients added to achieve a level of sterility for commercial distribution and retail sale. Additionally, retail products can have up to 20 ingredients such as gums, thickeners, vitamin packs, and preservatives that are added to this perishable liquid product to achieve an appealing taste, texture, color, etc., and to maintain that for commercially acceptable shelf life.

The commercial processes used to make commercial plant-based milk, such as nut milk, often occurs at high heat (e.g., 135° C./275° F.). This type of processing can cause degradations in flavor, color, and the smell of the milk. Also, a factor that drives up the cost of commercially distributed nut milk is the fact that they are water-based and must be refrigerated.

Making pure ("clean") plant-based beverages without preservatives is also challenging. These beverages usually contain only a few ingredients (e.g., nuts/nut paste and water), and may be too perishable to be sold through a distribution chain. Moreover, although the plant-based ingredients alone may not be perishable and can be stored at room temperature, those ingredients can become highly perishable once commercially processed with various liquids (e.g., water). Even the preservative-laced milk products may not last over a week in a consumer's refrigerator, due to transit times in distribution and time the product sits on a retail shelf before purchase.

Nut milk (e.g., almond milk) can be made in different ways. For example, nut milk can be produced by emulsifying/mixing nut powder (i.e., ground nuts) with other desired ingredients, such as water, spices, other flavorings, sweeteners, etc. Nut milk can alternatively be produced by emulsifying predetermined quantities of nut paste with other desired ingredients. Each technique for producing nut milk poses distinct challenges owing, in part, to the physical differences between nut powder and nut paste. For example, unlike nut powder, which typically has a dry, granular consistency, nut paste typically has a more fluidlike or pasty consistency caused by the release of natural oils from nut material during pulverization. These natural oils can "separate" from the more solid constituents of the nut paste over time, resulting in the formation of separate layers of different constituent materials in packaged nut paste.

In various embodiments of the present disclosure, a process of mixing various components, such as plant-based paste and water, includes a process of emulsifying these components, i.e., forming a stable emulsion of two or more components (e.g., paste and water) even when these components are immiscible. As used herein, the term stable emulsion refers to an emulsion having components that are not separable once being emulsified. Furthermore, as used herein, terms "mixing elements," "mixing chamber," and the like, may refer to "emulsifying elements," "emulsifying chamber," and the like.

The separation of constituent elements that occurs inside a package of nut paste poses challenges to producing high-quality nut milk from packaged nut paste. For example, it can be difficult to dispense a predetermined amount of packaged nut paste having the desired concentration of all constituent elements for emulsifying/mixing with other nut milk ingredients because the separation of nut paste constituents inside its packaging can result in disproportionate amounts of some separated constituents (e.g., heavy paste) exiting the packaging without proportional quantities of other constituents (e.g., oils). This can result in the production of poor-quality nut milk. This same challenge exists for other types of materials, including other food and beverage ingredients susceptible to separation, and is not limited to nut paste.

The present disclosure solves the problems related to the fabrication of nut-based milk described above (e.g., the problems associated with commercial processing of nut-based milk and the challenges associated with making pure ("clean") nut-based beverages). As described below, the invention emulsifies water with nut paste to make fresh nut milk on demand (i.e., the product is made fresh right in front of the customer), which negates the need for transporting refrigerated beverages (that can be 90% water). Thus, the present disclosure describes a beverage product emulsification and dispensing system that may be used to overcoming one or more of the problems set forth above and/or other problems of the prior art.

Accordingly, there is a need for providing systems and methods that improve the production of plant-based kinds of milk. The present disclosure addresses the problems set forth above, as well as other deficiencies in existing systems and methods. The disclosed system and methods further describe ways to form a milky product from the nut paste or cereal paste and to dispense the milky product to a consumer.

BRIEF DESCRIPTION OF THE DRAWINGS

The accompanying drawings are not necessarily to scale or exhaustive. Instead, the emphasis is generally placed upon illustrating the principles of the inventions described herein. These drawings, which are incorporated in and constitute a part of this specification, illustrate several embodiments consistent with the disclosure and, together with the detailed description, serve to explain the principles of the disclosure. In the drawings.

SUMMARY

Figure 1A:
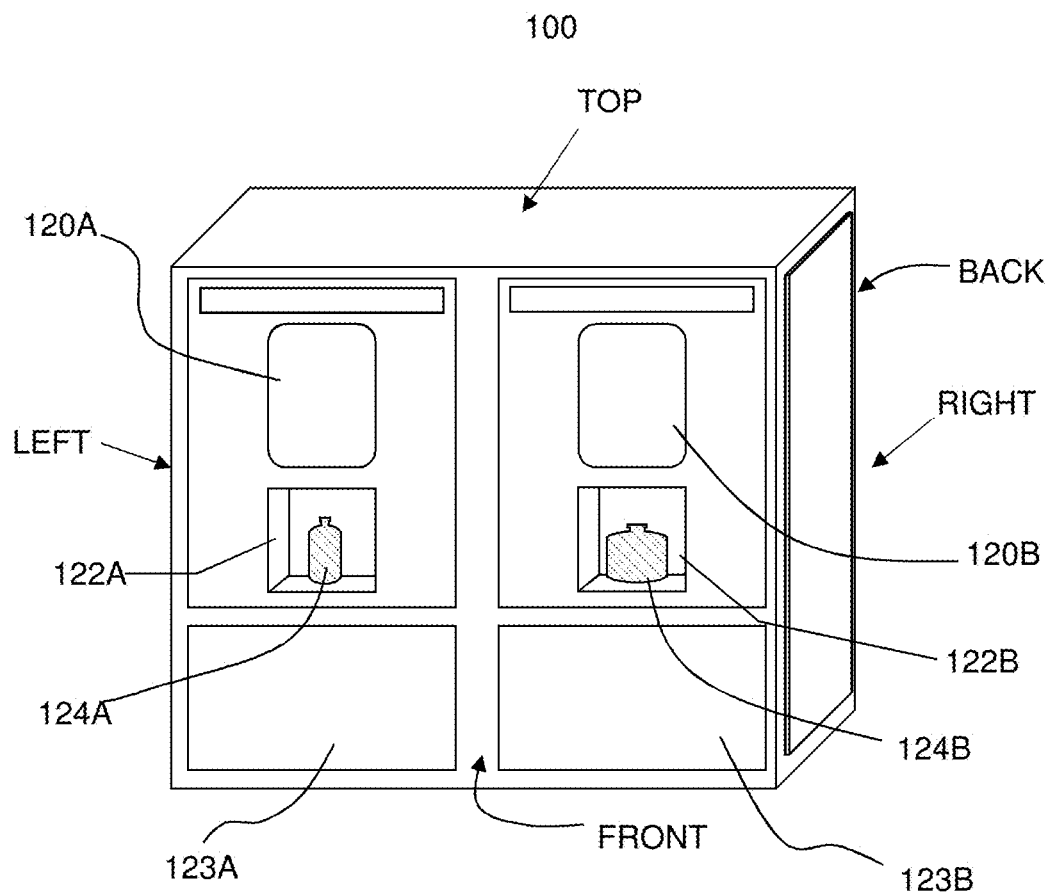
FIG. 1A is a front view of an example system for producing a food or beverage product, consistent with embodiments of this disclosure.

Consistent with disclosed embodiments, a system for dispensing a plant-based milk may include a mixing chamber configured to emulsify a plant-based paste and water, a plant-based paste storage connected to the mixing chamber via a first conduit, a water storage connected to the mixing chamber via a second conduit, and a cooling system. The cooling system may be configured to cool water within the water storage to a first prescribed temperature and to cool contents of the mixing chamber to a second prescribed temperature. Further, the system may include a pumping system configured to move a prescribed amount of the plant-based paste into the mixing chamber upon receiving an input from a user via a user interface, and a flow system configured for flowing water from the water storage to the mixing chamber. The system may also include a control system. The control system may be configured to receive the input from the user, activate the pumping system to move the prescribed amount of the plant-based paste into the mixing chamber, based on the input from the user, and activate the flow system to flow an amount of water into the mixing chamber, the amount of water corresponding to the prescribed amount of the plant-based paste. Further, the control system may be configured to activate the mixing chamber for emulsifying the plant-based paste and the water, and dispense the emulsified plant-based mixture of the paste and the water.

DETAILED DESCRIPTION

Reference will now be made in detail to exemplary embodiments, discussed with regards to the accompanying drawings. In some instances, the same reference numbers will be used throughout the drawings and the following description to refer to the same or like parts. Unless otherwise defined, technical and/or scientific terms have the meaning commonly understood by one of ordinary skill in the art. The disclosed embodiments are described in sufficient detail to enable those skilled in the art to practice the disclosed embodiments. It is to be understood that other embodiments may be utilized and that changes may be made without departing from the scope of the disclosed embodiments. Thus, the materials, methods, and examples are illustrative only and are not intended to be necessarily limiting.

In various embodiments of the present disclosure, a process of mixing various components, such as plant-based paste and water, includes a process of emulsifying these components, i.e., forming a stable emulsion of two or more components (e.g., paste and water) even when these components are immiscible. As used herein, the term stable emulsion refers to an emulsion having components that are not separable once being emulsified. Furthermore, as used herein, terms "mixing elements," "mixing chamber," and the like, may refer to "emulsifying elements," "emulsifying chamber," and the like. Emulsions may be part of a more general class of two-phase systems of matter called colloids. Although the terms colloid and emulsion are sometimes used interchangeably, emulsion should be used when both phases, dispersed and continuous, are liquids and/or pastes. In an emulsion, one liquid/paste (the dispersed phase) is dispersed in the other (the continuous phase). Examples of emulsions include vinaigrettes, homogenized milk, plant-based milks, and the like. The emulsion of plant-based paste and water may form a plant-based milk. Having plant-based paste emulsified with the water is essential for a high-quality plant-based milk.

An exemplary embodiment of a system 100 for producing a plant-based milk is illustrated in FIG. 1A. System 100 (also referred to as a kiosk 100) may be configured to receive, store, and dispense a food or beverage material (e.g., a paste, also referred to as a base), and form a plant-based milk (also referred herein as beverage). It should be noted that in some cases, food or beverage material may include animal-based food products (e.g., cheese, milk, and the like); nevertheless, for brevity, the beverage formed by kiosk 100 may be referred to as a plant-based milk. Kiosk 100 may be a vending machine that dispenses several types of food or beverage products, as shown in FIG. 1A. Kiosk 100 may be formed from any suitable material such as metal (e.g., aluminum, steel, etc.) plastic, glass, rubber, and the like. FIG. 1A shows Front, Top, Back, Left, and Right portions of kiosk 100. Front portion, as shown in FIG. 1A, may have an interface 120A for selecting various options for a beverage product such as an amount of the beverage product, creaminess of the beverage product (e.g., a ratio of base-to-water for a nut-based milk may determine the creaminess of the nut-based milk product), additives to the beverage product (e.g., additives to the beverage product may include a maple syrup, vanilla flavor, chocolate flavor, presence and amount of ice, sweeteners, vitamins, proteins, oils, live probiotic cultures, fibers, grains, nuts, nut particles, and the like). Further interface 120A may be used to select other properties of the beverage product, such as a temperature of the product or color of the product (e.g., color of the product may be affected by a food coloring).

Interface 120A may be any suitable interface for selecting various options for a beverage product. For example, the interface may include a touch screen, a set of buttons, a set of levers, an audio interface (e.g., interface 120A may capture audio signals from a user, such as speech of a user), an image capturing interface (e.g., interface 120A may capture user gestures), or any other suitable interface (e.g., a graphical interface that can be interacted with a computer mouse).

Kiosk 100 may have an enclosure 122A for placing a container 124A (also referred to as a bottle 124A, with understanding that container 124A may be any suitable container, e.g., a plastic box, a cardboard box, a cup, and the like made from any suitable material) that can be filled with beverage product that may be configured to be flown from a beverage product dispensing device (e.g., a nozzle) located in a top portion of enclosure 122A. Enclosure 122A may be accessible from a front of kiosk 100. A user may place bottle 124A into enclosure 122A such that a beverage product can be allowed to pour in bottle 124A without being spilled. In various embodiments, after placing bottle 124A, the user may, via interface 120A, initiate dispensing the beverage product into bottle 124A. In an example embodiment, kiosk 100 may be configured to detect a presence of bottle 124A within enclosure 122A (e.g., kiosk 100 may include a photosensor for detecting bottle 124A, a weight sensor, and the like). In various embodiments, kiosk 100 may have a computing device configured to facilitate execution of various checks prior to dispensing the beverage product. For example, the computing device may check for presence of plant-based base within kiosk 100, check for presence of purified water within kiosk 100, check temperature of the purified water and the base within kiosk 100, and test operations of various valves of kiosk 100 prior to dispensing the beverage product. Various checks for the computing device are further described below.

FIG. 1A shows that kiosk 100 may have a left side with interface 120A, and enclosure 122A, and a right side with interface 120B and enclosure 122B that may contain a bottle 124B. In an example embodiment, the left side may dispense a first type of beverage product (e.g., a nut-based milk such as almond milk, cashew milk, and the like) and the right side may dispense a second type of beverage product (e.g., a grain-based milk such as oat-based milk, and the like). It should be noted that any suitable beverage product that requires mixing (including emulsifying) a base (e.g., paste) with a liquid (e.g., water) may be dispensed. For example, any plant-based milk (e.g., seed-based milk) may be dispensed. Some examples of plant-based kinds of milk may include sunflower seed milk, pumpkin seed milk, chocolate hemp milk, sesame milk, peanut milk, and the like. In various embodiments, to ensure that there is no contamination for the milk, each side of kiosk 100 may dispense only a particular type of milk (e.g., left side of kiosk 100 may dispense almond milk, and right side of kiosk 100 may dispense oat-based milk). In an example embodiment, as a beverage is dispensed in a bottle (e.g., bottle 124A) bottle 124A may be weighted to ensure that it receives a correct amount of plant-based beverage product.

In various embodiments, the beverage product may involve mixing (including emulsifying) a base with water. The base (e.g., plant-based paste) may include plant material (e.g., nut or grain) that is preprocessed and stored in an enclosure to prevent spoilage. The plant-based paste may be made using any suitable solution (e.g., by milling nuts into smaller particles, releasing their oils, and refining down to a liquid viscosity) While many nuts and seeds have enough oil content to be milled into a liquid paste with no additives, grain based milks such as oat milk or rice milk may require the addition of enzymatic reactions such as amylase, and or an additional plant based oil, such as sunflower oil. To provide best emulsion/mix of final product/milk, and to have the most efficient pumping of plant paste, the avg micron size should be below 100 um, and a target micron size of 1-20 um. The paste may also be pasteurized at 160-180 f to kill spoilage organisms, and create a longer shelf life of final milk product.

In various embodiments, one or more types of bases may be stored in a storage container located in a compartment of kiosk 100. For example, FIG. 1A shows compartments 123A and 123B, which may store plant-based paste. These compartments may be cooled and may have corresponding access doors.

Figure 1B:
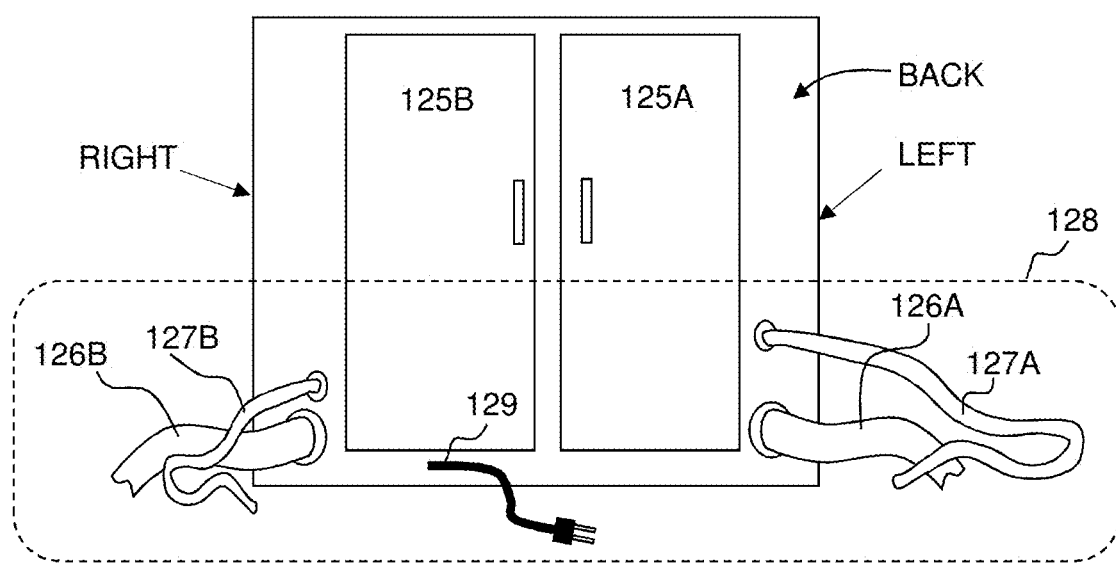
FIG. 1B is a back view of an example system for producing a food or beverage product, consistent with embodiments of this disclosure.

FIG. 1B shows a back view of kiosk 100 that may include doors 125A and 125B as well as conduits 128 that may include conduits 126A, 127A, 126B, and 127B. Doors 125A and 125B may be used to access various components of kiosk 100. The components may include air/water pumps, one or more refrigerating units, cooling coils, water tanks, mixing chambers for mixing (including emulsifying) water and plant-based paste, pumps for transporting the plant-based paste from storage units to mixing chambers, pumps for transporting water from a water tank to the mixing chambers via appropriate conduits configured to flow water from the water tank to the mixing chambers, electrical control board, cleaning fluids for cleaning various components of kiosk 100 and the like. Further details of various components of kiosk 100 are described below. Conduits 128 may be used to deliver water (or other fluids) in and out of kiosk 100. In example embodiments, some of the conduits (e.g., conduit 126B) may be configured to transport used-up water (i.e., water that cannot be recycled by the machine) to a sewer system. In some cases, water with admixed chemicals used for cleaning purposes may be transported to a sewer system, and in other cases, at least some conduits 128 may be connected to a storage enclosure configured to collect the used-up water from kiosk 100. In various embodiments, at least some of conduits 128 may be connected to a water supply (e.g., tap water supply) for supplying water into kiosk 100. Such water may be used by kiosk 100 for variety of purposes. For example, the water may be used for cleaning purposes, or the water may be filtered (e.g., using carbon block filter, reverse osmosis, or any other suitable approach) for providing purified water for kiosk 100. In various embodiments, the filtered water may be sanitized using an ultraviolet (UV) radiation. Further, kiosk 100 includes a power supply cable 129, as shown in FIG. 1B, for delivering electrical power to various components of kiosk 100.

Figure 1C:
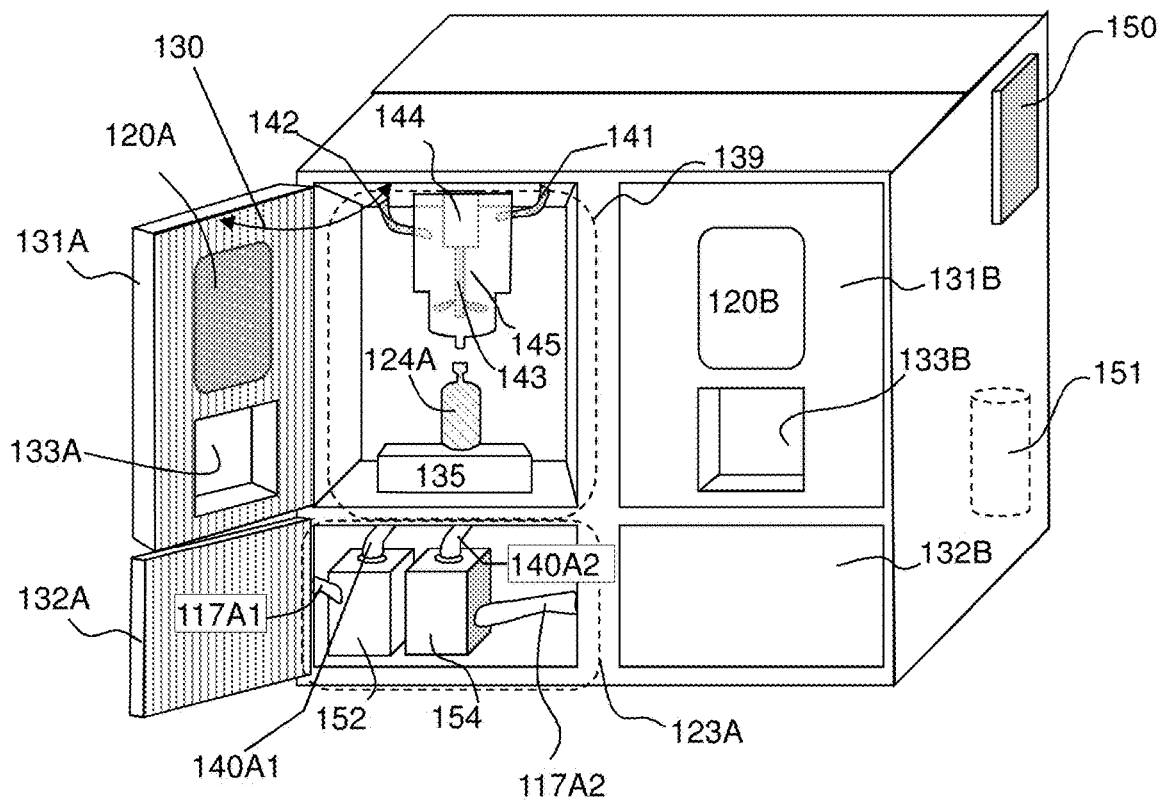
FIG. 1C is another front view of an example system for producing a food or beverage product, consistent with embodiments of this disclosure.

FIG. 1C shows a front portion of kiosk 100 that may include front doors 131A, 132A, 131B, and 132B. Open doors 131A and 132A may correspond to a left side of kiosk 100, and closed doors 131B and 132B may correspond to the right side of kiosk 100. Door 131A (131B) may incorporate interface 120A (120B) as shown in FIG. 1C. In some embodiments, doors 131A and 132A may open outwards (i.e., clockwise using left-side hinge) as shown by arrow 130, and in other embodiments door 131A and/or 132A may be opening upwards, downwards, or towards the middle of kiosk 100 (i.e., counter-clockwise using a right-side hinge). In various embodiments, door 131A may include wiring for powering interface 120A. For example, wiring may run from a body of kiosk 100 to door 131A via a wire or can be directed through a hinge of door 131A using any suitable approach (e.g., electrical hinge).

Figure 1D:
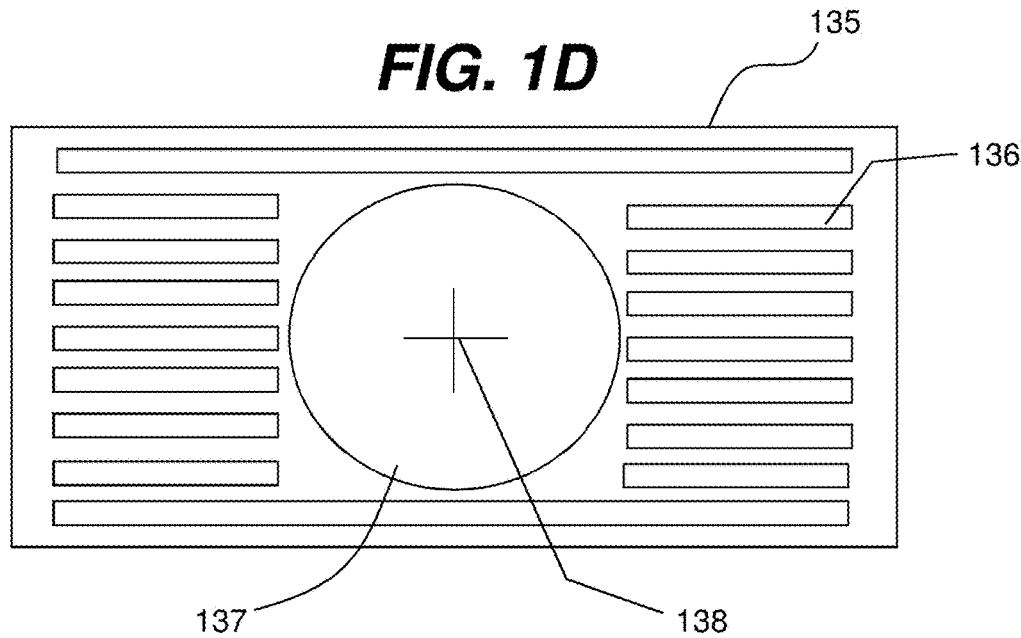
FIG. 1D is a top view of a bottle holder, consistent with embodiments of this disclosure.

Door 131A (door 131B) may include an opening 133A (opening 133B) through which a user may place bottle 124A onto a bottle stand 135. An example bottle stand is shown in FIG. 1D and may include a region 137 for placing bottle 124A as well as openings 136 for collecting spilled plant-based milk or water. Region 137 may be an indentation in stand 135, such that when bottle 124A of a particular size is placed in region 137, the plant-based milk can be poured into bottle 124A without being spilled. For example, a nozzle of a mixing chamber 145, shown in FIG. 1C, may be positioned directly above the center 138 of region 137 to ensure that plant-based milk is not spilled when poured into bottle 124A. In an alternative embodiment, region 137 may not include indentation, and instead include a guiding circle (a guiding square for square bottles, a guiding hexagon for hexagonal bottles, or any other suitable shape designed for similarly shaped bottles) for placing bottle 124A over stand 135 to prevent spillage of plant-based milk (also referred to as a beverage). In some embodiments several concentric shapes can be used as guides for placing different types of bottles.

Returning to FIG. 1C, door 131A leads to an enclosure 139 that contains chamber 145. Chamber 145 is configured to receive plant-based paste via a base inlet 141, and water via a water inlet 142. Chamber 145 may include a mixing element 143 and a motor 144 for actuating mixing element 143 to mix (including emulsify) the water and the plant-based paste in chamber 145. In an example embodiment, element 143 may contain a set of blades positioned for efficient mixing (including emulsifying) of the water/paste composition within chamber 145. Element 143 may be rotated around its vertical axis by motor 144, which may be any suitable motor (e.g., electrical motor, pneumatic motor, and/or the like). In an example embodiment, mixing element 143 (which is capable of emulsification) may be rotated at high speed (e.g., 5500 rpm).

In an alternative embodiment, mixing element 143 may include a set of meshes, and motor 144 may be a pump configured to pump the water/paste composition via the set of meshes. Further details of such a mixing system (which can emulsify) will be discussed further.

FIG. 1C further shows door 132A leading to compartment 123A that may contain one or more storage containers (e.g., containers 152 and 154, as shown in FIG. 1C). These containers may contain plant-based paste that can be transported from a container by means of a suitable pump (e.g., vacuum pump, peristaltic pump, and the like). While compartment 123A is shown as located at the bottom portion of kiosk 100, in some cases, compartment 123A may be located at a top portion of kiosk 100, and plant-based paste may be transported from containers 152 and 154 with assistance of gravity. In various embodiments, plant-based paste may be configured to be flowable (i.e., exhibit properties of a liquid, while being transported from containers 152 and 154 to mixing chamber 145, which is capable of emulsification). For such configuration, plant-based paste may be flown from containers 152 and 154 via corresponding outlets 140A1 and 140A2. To maintain pressure within containers 152 and 154, inlets 117A1 and 117A2 may supply pressurized gas (e.g., air) into these containers.

Figure 1E:
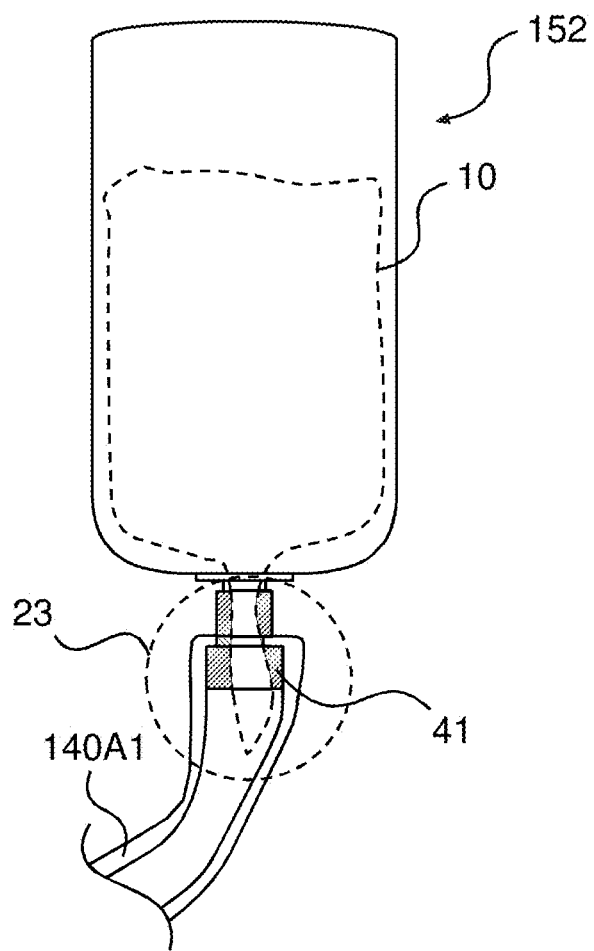
FIG. 1E is an example pouch for containing a plant-based paste, consistent with embodiments of this disclosure.

An example container for containing plant-based paste (e.g., container 152) is shown in FIG. 1E. Container 152 may be made from any suitable material and may be of any suitable shape. Container 152 may be sized and shaped to fit the particular size and geometric requirements for system design. For example, container 152 may include a rectangular, cylindrical, spherical, conical, tapered, or another exterior shape. In an example embodiment, the container 152 may be a flexible pouch (herein referred to as pouch 152). FIG. 1E shows pouch 152 containing base 10, which may be any suitable plant-based paste (e.g., almond paste, cashew paste, and the like). Pouch 152 may be formed from any food grade material such as high-density polyethylene, polyethylene terephthalate, fluoropolymer, and/or the like. In some cases, pouch 152 may be formed from a polymeric, plastic, paper, or metal foil material. In an example embodiment, flexible pouch 152 may be formed from an antifouling material or may include an antifouling coating (e.g., anti-sticking coatings).

As shown in FIG. 1E, pouch 152 may have an outlet valve 41 that may be a food-grade unidirectional silicone valve designed to release base 10 from pouch 152 when a pressure difference is applied across the valve, with pressure being lower outside pouch 152. In various embodiments, valve 41 may include a head unit for a tight connection to conduit 140A1 (e.g., tight connection in region 23). In an example embodiment, the head unit may include a sanitary nipple. In an example embodiment, conduit 140A1 may be directly connected to the head unit (e.g., sanitary nipple). Alternatively, or additionally, conduit 140A1 may be connected to a manifold that may be connected to the head unit. In an example embodiment, conduit 140A1 may be connected to the head unit using any suitable solution such as "push to connect" connection that may involve pushing an end of conduit 140A1 over the head unit. Alternatively, conduit 140A1 may include a screw fitting that may connect with the head unit via a screwing action.

Figure 1F:
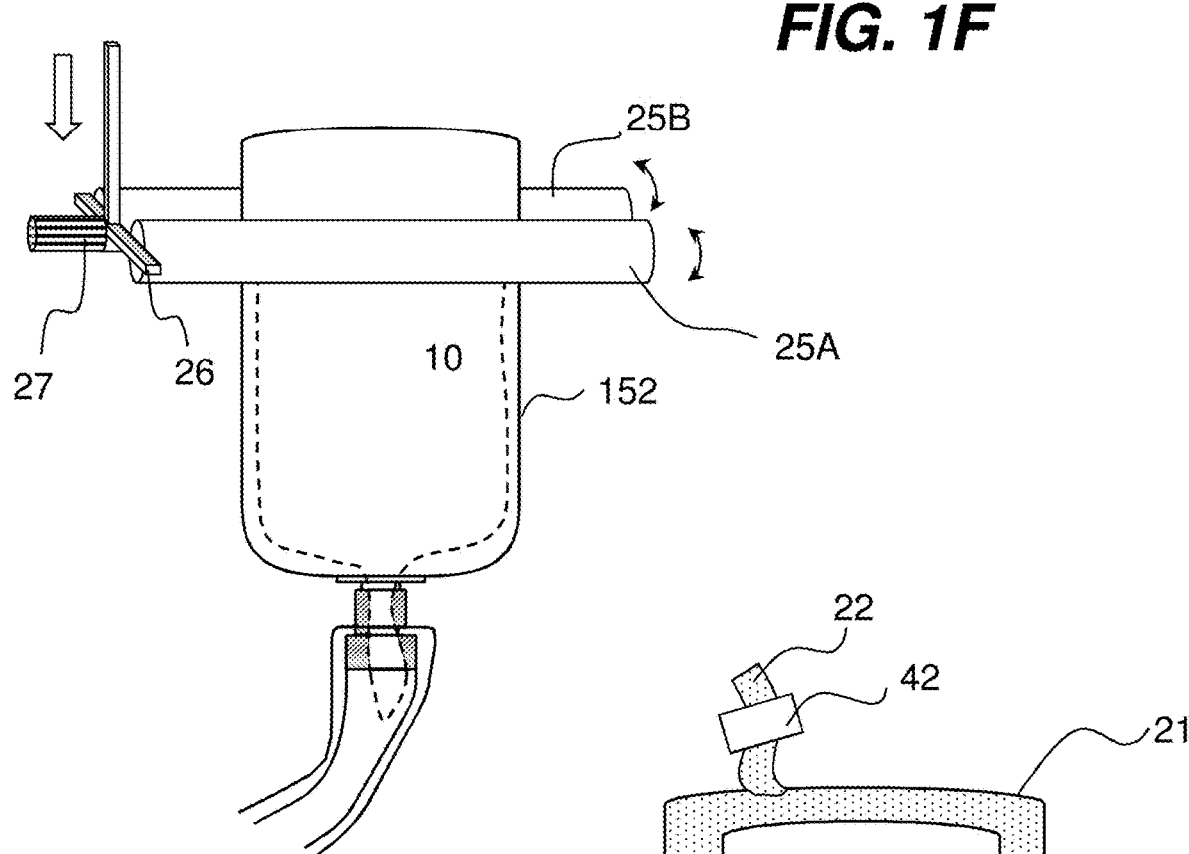
FIG. 1F is an example device for extracting plant-base paste from a pouch, consistent with embodiments of this disclosure.
Figure 1G:
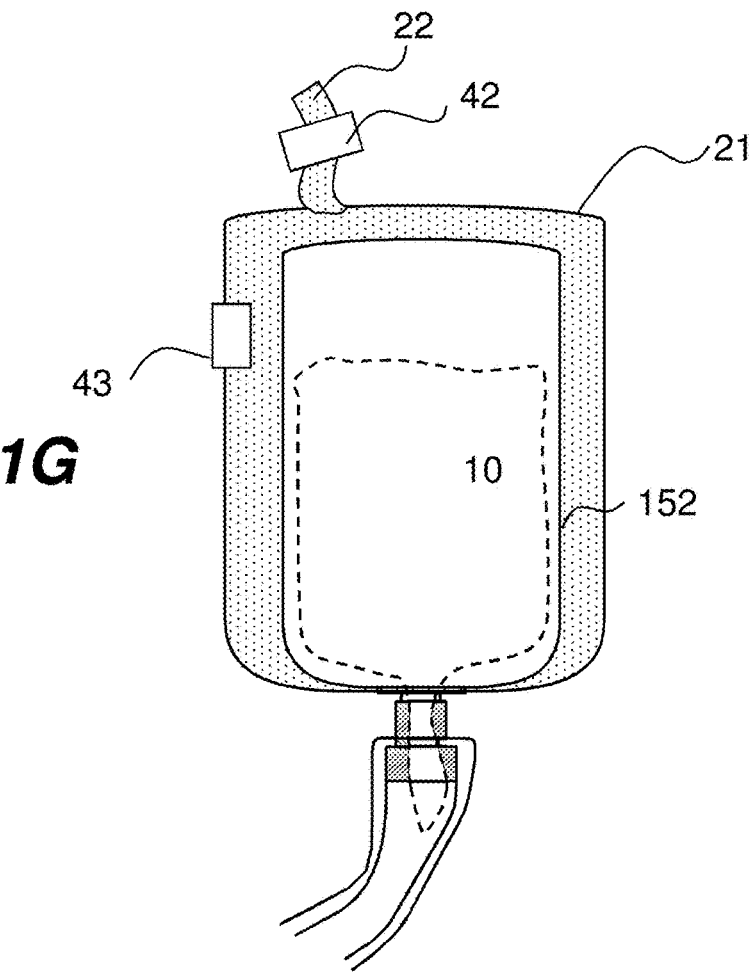
FIG. 1G shows an example embodiment for extracting plant-based paste from a pouch, consistent with embodiments of this disclosure.

In various embodiments, base 10 may be extracted from pouch 152 using any suitable means. In an example embodiment shown in FIG. 1F, base 10 may be squeezed from pouch 152 using movable rotatable rollers 25A-25B supported by unit 26, and activated by motor 27. In an alternative embodiment shown in FIG. 1G, pouch 152 may be located within another pouch 21, and base 10 may be squeezed from pouch 152 by establishing pressure in pouch 21. In an example embodiment, the pressure within pouch 21 may be established by pumping gas (e.g., air) into pouch 21 via a valve 42 of a connection 22. In various embodiments, valve 42 may be a one-way valve allowing air to enter pouch 21 but not exit pouch 21. In an example embodiment, pouch 21 may have a release valve 43 for releasing air from pouch 21 when necessary.

In some embodiments, pouch 152 may be configured to be cooled to prevent or inhibit the separation of constituent components of the material in pouch 152 (e.g., of plant-based paste). Pouch 152 may be configured to receive or contact a cooling agent to cause the contents of the chamber to be cooled. Cooling agents may include materials that may facilitate heat transfer to cause the material in pouch 152 to be cooled, such as air, water, a refrigerant, a gas, or a cooling substance (e.g., a cooled gas, liquid, or solid material). In some embodiments, pouch 152 may be combined with, connected to, or located in proximity to a cooling device or component. For example, pouch 152 may be surrounded by a component or container (e.g., a cooling jacket) configured to allow a cooling agent to surround and contact pouch 152 for cooling the contents of pouch 152. In some embodiments, space surrounding pouch 152 may be cooled (e.g., using a refrigeration system) to allow pouch 152 be positioned in a cooled environment for causing the contents of the chamber to be cooled.

The flow of plant-based paste via outlets 140A1 and 140A2 may be controlled by valves which may be opened/closed based on an electrical signal received as a result of inputs from interface 120A. The valves controlling the flow of plant-based paste may be any suitable valves (e.g., electrical valves, pneumatic valves, and the like). In some embodiments, when valves are pneumatic, a compressor may be used for opening and closing the valves. For example, compressor may operate the example pneumatic valves at 40-120 psi.

Figure 1H:
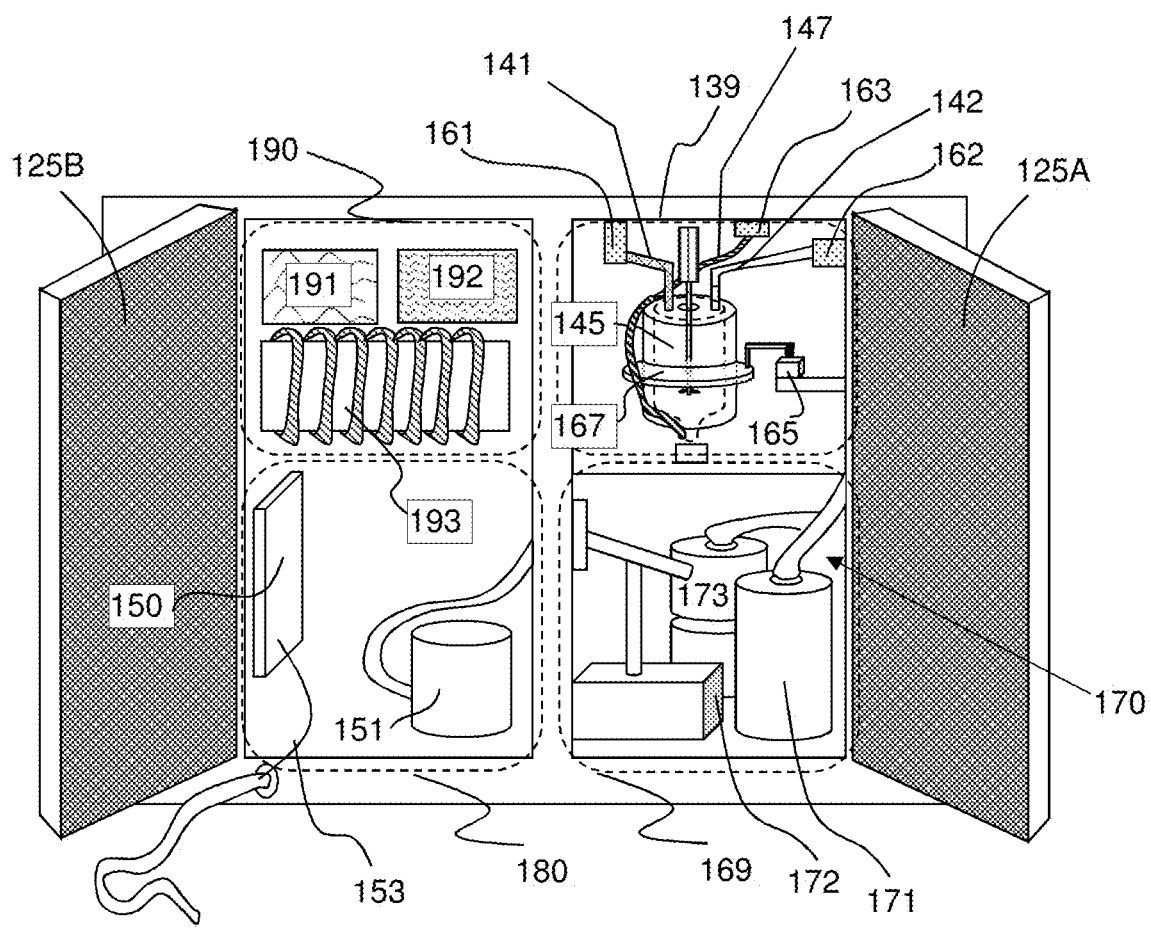
FIG. 1H is another back view of an example system for producing a food or beverage product, consistent with embodiments of this disclosure.

In various embodiments, valves may be controlled by a computing device 150 (e.g., raspberry pie, the programmable logic controller (PLC), and the like), as shown in FIG. 1H. In various embodiments, the processor may include memory device (e.g., Random Access Memory, and the like), a storage device (e.g., a hard drive, solid-state drive, and the like). In various embodiments, computing device 150 may control some/all of the aspects of operation of kiosk 100, such as functions of various valves, motors, compressors, displays, buttons, and the like. For example, computing device 150 may control input/output data for interfaces 120A and 120B. In an example embodiment, when a user selects an option via interface 120A (120B) for a plant-based milk, computing device 150 may determine a set of consecutive operations for producing a beverage and send signals to a pneumatic manifold to start a compressor 151, as shown in FIG. 1H, to provide gas pressure to various valves controlled by computing device 150. In some cases, air compressor 151 may be configured to fill up an air storage tank with air maintained at high pressure, and use air from the air storage tank to activate various valves. Air compressor 151 may replenish air in the air storage tank when pressure in the air storage tank is below a target minimal value.

In an example embodiment, computing device 150 may open one or more valves controlling a flow of base, one or more valves controlling the flow of purified water, one or more valves controlling the flow of water for cooling various parts of kiosk 100, and one or more valves controlling additives for a beverage (e.g., a maple syrup, vanilla syrup, and the like). Further computing device 150 may control various other components of kiosk 100, such as a motor for mixing (including emulsifying) water and paste/base, pumps for pumping cleaners through different portions of kiosk 100, a refrigeration unit for cooling various components of kiosk 100, and the like.

FIG. 1H shows a back view of kiosk 100. Various components of kiosk 100 may be accessible from the back of kiosk 100 via doors 125A and 125B, as shown in FIG. 1H. Similar to the previous discussion related to doors 131A and 132A, doors 125A and 125B may open in any suitable way. FIG. 1H shows that various compartments, such as compartments 169, 139, 180 and 190 may be accessible from the backside of kiosk 100. For example, compartment 139 contains mixing chamber 145, as previously discussed, and may contain various conduits (e.g., conduits 141 and 142) connected to various valves (e.g., valves 161 and 162, as shown in FIG. 1H). Furthermore, conduit 147 may be used to supply additives to a beverage (e.g., maple syrup), and the supply of additives may be controlled by valve 163. In various embodiments, chamber 145 may be weighted using scale system 165. The scale system may be connected to mixing chamber 145 using any suitable means. In an example embodiment, scale system 165 is solidly connected to mixing chamber 145 using a solid member 167. In some cases, scale system 165 may be configured to measure continuously the weight of mixing chamber 145 and the ingredients of base/water mix in chamber 145.

FIG. 1H shows compartment 169, containing a clean-in-place (CIP) system 170 that includes various cleaners and sanitizing agents for cleaning/sanitizing various parts of kiosk 100. For example, storage container 171 may contain a CIP cleaner, and container 172 may contain a sanitizing agent. Further other containers (e.g., container 173) may contain other cleaning agents (e.g., another type of CIP cleaner or another type of sanitizing agent). In various embodiments, storage containers 171-173 may store cleaning liquids at high concentrations and may be accessible only by trained technicians having appropriate safety gear. In some cases, compartment 169 may have a separate door (not shown).

FIG. 1H further shows compartment 180 that may include compressor 151 and computing device 150 as previously described. As described before, compressor 151 may provide pressure to pneumatically control different valves of kiosk 100, and computing device 150 may operate a set of switches (e.g., electrical solenoid-based switches) to select the valves that need to be opened. Computing device 150 may be connected to a network via cable 153, and be configured to communicate variety of data (e.g., kiosk usage data, amount of water and based remaining within kiosk 100, compressor pressure data, temperature of water and base within kiosk 100, coolant levels for a refrigeration unit, amount of the cleaner or sanitizer in the CIP system, and the like) to an administrator of kiosk 100, to a supplier of kiosk 100 or to any other authorized entity.

As shown in FIG. 1H, kiosk 100 may include compartment 190 for storing purified water in storage tank 191, as well as tank 192 for storing a tap water for use with the CIP system 170. In various embodiments, storage tank 191 may be connected to mixing chamber 145 via a suitable conduit.

In some cases, tap water may be disinfected via heating or using chemicals, such as chlorine. In various embodiments, kiosk 100 may have more than one storage tank for purified water. For example, as a first storage tank is being emptied, kiosk 100 may be configured to use a second storage tank of purified water, while refilling the first storage tank with the purified water and chilling the first storage tank of the purified water to a target temperature. In various embodiments, the sized for the first and the second storage tank for the purified water may be selected such that the first storage tank may be refilled and chilled during an interval of time that is less than the time required to empty the second storage tank when continuously dispensing a plant-based beverage product.

As shown in FIG. 1H, compartment 190 may also contain a refrigeration unit 193 that may maintain various components of kiosk 100 at a required temperature. For example, refrigeration unit 193 may chill the purified water to a near-freezing temperature. In some embodiments, refrigeration unit may be configured to freeze at least a portion of the purified water into ice cubes to further prevent bacterial growth. In some cases, ice cubes may be melted (e.g., ice cubes may be melted by placing them in an enclosure containing purified water at a slightly above freezing temperature) shortly before using the purified water for making a beverage. It should be noted that refrigeration unit 193 may be used for maintaining temperature of various objects/compartments of kiosk 100. For example, unit 193 may circulate coolant to cool compartments 123A and 123B containing plant-based paste. Further unit 193 may circulate coolant in vicinity of mixing chamber 145 to cool plant-based milk within chamber 145. In an example embodiment, chamber 145 may include a cooling jacket, as further described below, for cooling plant-based milk to temperatures in a range of 0-5° C.

In various embodiments, at least one of the compartments may include a heater designed to heat water for using hot water (or steam) for cleaning purposes. In an example embodiment, heater may be activated during a cleaning procedure. The heater may be configured to heat tap water (e.g., water in storage tank 192).

It should be noted that compartments shown in FIGS. 1A-1H are only illustrative, and various other configurations may be used. For example, plant-based paste may be located at the back of kiosk 100 at a top portion of kiosk 100. Further, compartments may combine various elements (e.g., mixing chamber 145, compressor 151, computing device 150, and the like) in any suitable way. For instance, compartment 180 may include a refrigeration unit 193, and compartment 190 may include a computing device 150.

In some cases (not shown in FIG. 1A-1H) kiosk 100 may include a "grab-and-go" refrigerator section for containing bottles prefilled with various types of plant-based beverages. Such bottles may be filled at the beginning of the day with various plant-based beverages. Such grab-and-go section, may allow users to quickly get a bottle of plant-based milk without a need of waiting for kiosk 100 to dispense a required beverage. In an example embodiment, bottles within grab-and-go section may be tracked using any suitable sensors (e.g., using photo sensors), and when a bottle is removed from grab-and-go section, a sensor may send a signal to computing device 150 indicating that the bottle has been removed. In some cases, a bottle may have a tag (e.g., radiofrequency id (RFID), a colored lid, and the like) to indicate a type of beverage contained in the bottle. The tag-related information may be detected by sensors in grab-and-go section and transmitted to computing device 150 for accounting purposes. For example, computing device 150 may keep track of the number of bottles within grab-and-go section, a type of beverage selected by customers, and whether customers move one or more bottles from one portion of grab-and-go section to another portion of grab-and-go section. In some cases, bottles in the grab-and-go section may be placed on shelves that contain indentations configured to position a bottle at a particular location relative to a sensor (e.g., for positioning a bottle below a photosensor).

Figure 1I:
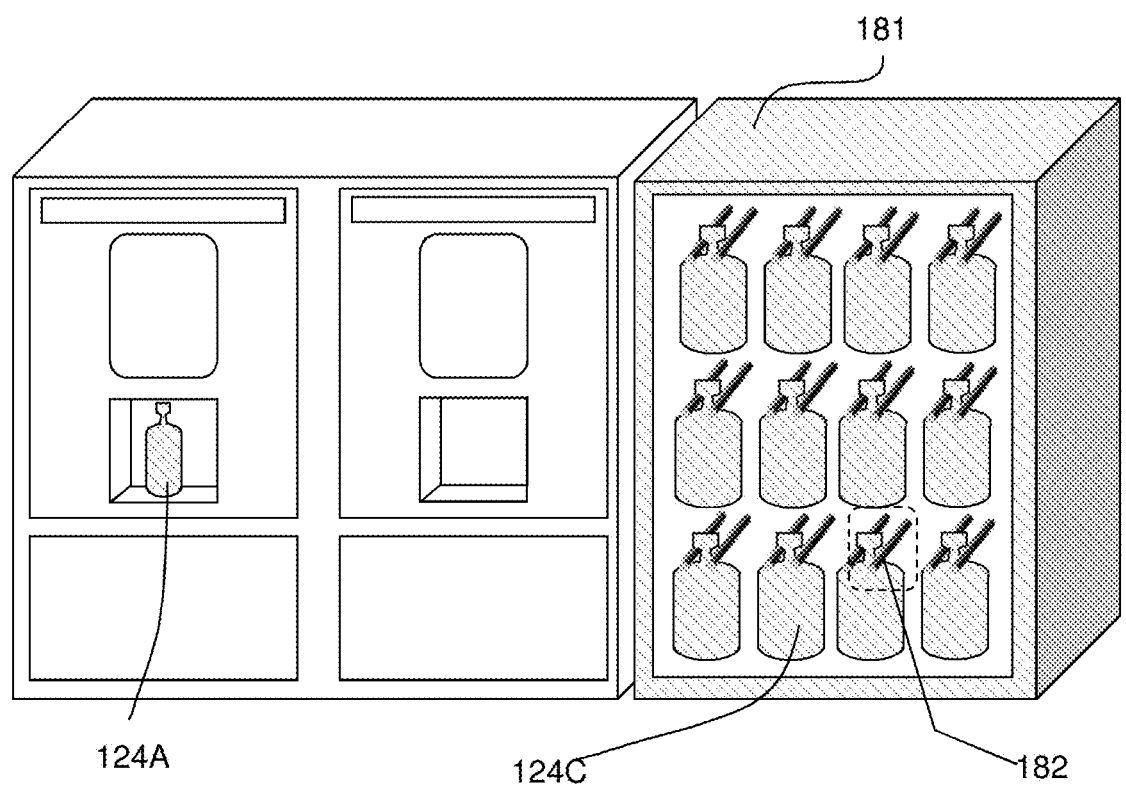
FIG. 1I is an example shelving system for supporting bottles, consistent with embodiments of this disclosure.
Figure 1J:
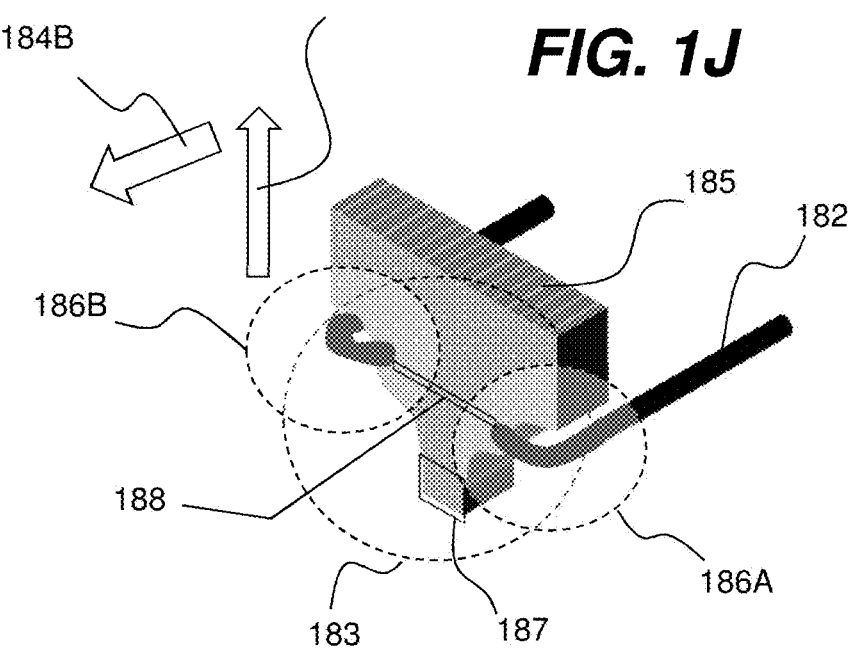
FIG. 1J is an example embodiment of rails for supporting a neck of a bottle, consistent with embodiments of this disclosure.

FIG. 1I shows a shelving system 181 that contains bottles (e.g., a bottle 124C) hanging off rails 182. Rails 182 may be organized in rows and columns, as shown in FIG. 1I and each rail may contain several bottles. The bottles may be pulled from the rails and used by the customers. In various embodiments, bottles may include an appropriate tag that can be used to determine the price of a beverage. In some cases, kiosk 100 may produce a paper sticker tag that can be attached to the bottle to determine the price of the beverage (e.g., the sticker may include a universal product code (UPC) code). In various embodiments, a user may place a cap on the bottle once it is filled with a beverage. In some cases, as shown in FIG. 1J, bottles may be held over rails 182 by a bottle's neck 185. Various rails may be slightly slanted, allowing the bottles to slide toward an end of the rails indicated by region 183. End of the rail 183 may have hooked elements 186A and 186B, preventing bottle 124C from sliding off rails 182. Using upward motion indicated by arrow 184A, bottle neck 185 may be moved upward relative to rails 182, thus, allowing the bottle to be removed from rails 182 by motion indicated by arrow 184B. The release of bottle neck 185 can be achieved due to a particular shape of bottle neck 185 (i.e., narrowing of bottle neck 185 in region 187, allowing region 187 of bottle neck 185 to pass through a space 188 between elements 186A and 186B).

It should be noted that design of rails 182 and bottle neck 185 is only illustrative and any other suitable mechanism may be used to release a bottle from rails 182 (e.g., end of rails 182 may have spring-loaded clamps that hold the bottle, and may release the bottle when bottle is pulled from rails 182). Further, placing bottles such that rails 182 support a bottle is only one example embodiment. For instance, in an alternative embodiment, the bottles may be simply placed on shelves.

It should be noted that any other suitable designs of bottles may be allowable. In some cases, users may be allowed to bring their own bottles. In some cases, bottles may be configured to be compressed, and each bottle may occupy a small amount of space. Such bottles may be formed by uncompressing them (i.e., extruding them from the compressed state). Such bottle design may allow for increased number of bottles that can be stored within kiosk 100, as well as easier loading of the bottles.

Figure 2A:
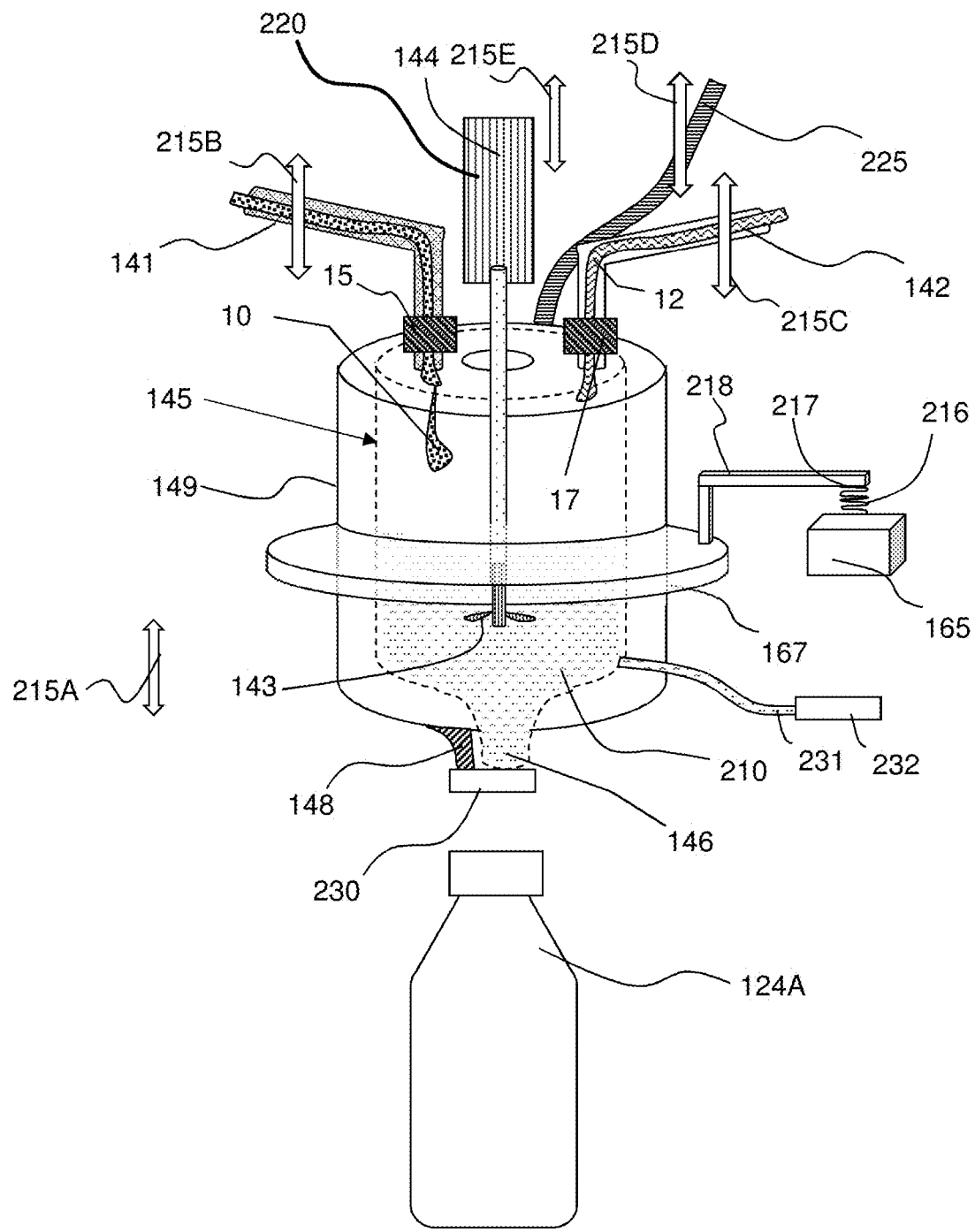
FIG. 2A is a schematic illustration of an example mixing chamber (capable of emulsifying), consistent with embodiments of this disclosure.

In various embodiments, kiosk 100 may include one or more mixing chambers 145, as shown in FIG. 2A, configured to receive base 10 from pouch 152 (e.g., via a conduit 141, as shown in FIG. 2A). Mixing chamber 145 may have any suitable shape, such as a cylindrical, spherical, rectangular, or another shape, and it is capable of emulsifying the materials it is mixing. Mixing chamber 145 may be formed of any suitable material, such as metal, plastic, glass, and/or another type of material. In some embodiments, mixing chamber 145 may include an outlet 146 (also referred to as nozzle 146) for dispensing material (e.g., a food or beverage product) from mixing chamber 145.

In various embodiments, conduit 141 may be connected to mixing chamber 145 via a valve 15 and be configured to only allow flow from pouch 152 to mixing chamber 145. For example, valve 15 may be a check valve or a poppet valve and/or the like. As shown in FIG. 2A, mixing chamber 145 may include a mixing element 143 driven by a motor 144. Mixing element 143 may be configured to mix food or beverage materials within mixing chamber 145. Mixing element 143 may be shaped to promote the mixing (including emulsifying) of materials within mixing chamber 145. For example, mixing element 143 may include bars, hooks, blades, paddles, whisks, beaters, spatulas, and/or other shapes, tools, or devices. It is contemplated that mixing element 143 may include one or more shapes, tools, or devices (i.e., it may include a single shape, tool, or device or multiple shapes, tools, or devices). In some embodiments, mixing element 143 may also or alternatively include one or more components configured to scrape or wipe interior portions of mixing chamber 145. For example, mixing element 143 may include one or more paddles, extensions, wipers, etc., configured to contact interior portions of mixing chamber 145 to collect, dislodge, or wipe material thereon.

Motor 144 may be an electric motor, such as a direct current (DC) motor, servomotor, or an alternating current (AC) electric motor. In some embodiments, amount of force and/or the speed at which mixing element 143 is rotated may partially define the requirements (and thus the design) of the motor 144 and/or the suitability of various types of commercially available motors that may be used. For example, in some instances, the motor 144 may only be required to achieve a single speed or power level. In other embodiments, the motor 144 may be required to achieve multiple speeds. In some cases, motor 144 may be a pneumatically driven or hydraulically driven motor. It is to be appreciated, that similar considerations of speed and power requirements of the motor 144 may be addressed for pneumatic or hydraulic motors by considering motor parameters, such as pressure, displacement, rotational speed, rotational direction, time-dependent rotational speed (e.g., pulsed operation), as well as application considerations (e.g., size, cost, complexity, serviceability, maintenance, sanitation, etc.). The motor 144 may be equipped with a suitable power source, such as an electrical power source (e.g., a battery, a capacitor, a power supply, a direct connection to utility power, etc.), a pneumatic power source (e.g., a compressor, a tank, an accumulator, etc.), a hydraulic power source (e.g., a pump, a tank, an accumulator, etc.), and associated electrical or mechanical conduit.

Mixing chamber 145 may include one or more additional openings having valves configured to receive materials or process aids from one or more input sources (e.g., water source). For example, mixing chamber 145 may include a second opening for conduit 142 configured to receive water 12 from a water source. Conduit 142 may be connected to mixing chamber 145 via a valve 17. In various embodiments, valve 17 may be configured to only allow flow from the water source to mixing chamber 145. For example, valve 17 may be a check valve or a poppet valve and/or the like.

In various embodiments, mixing chamber 145 may include a pressure sensor associated with (e.g., connected to, disposed within, etc.) mixing chamber 145 and configured to generate a pressure measurement signal based on the amount of product present in chamber 145.

FIG. 2A shows an example mixing chamber 145 surrounded by a cooling jacket 149. Cooling jacket 149 may include channels for circulating a cooling fluid, configure to chill base/water mix 210 (also referred to as a beverage 210 or a plant-based milk 210), as shown in FIG. 2A. As previously described, conduit 141 may be used to transport base 10 into mixing chamber 145. Further conduit 142 may be used to transport purified water into chamber 145. Mixing chamber 145 may also include an additional conduit 225 for delivering cleaning agents to mixing chamber 145 during a cleaning process. Base 10 and a purified water 12 may be mixed (including emulsified) using mixing element 143 that may be spun around its vertical axis using motor 144. Mixing chamber 145 may include a nozzle 146 configured to pour beverage 210 into bottle 124A. In addition, conduit 147 may include additives, as discussed before, that can be poured into bottle 124A via a nozzle 148. In various embodiments, nozzles 148 and 146 may be combined into a single outlet channel. In various embodiments, the additives do not enter mixing chamber 145 in order not to contaminate the mixing chamber and, thus, auxiliary nozzle (nozzle 148) is required for delivering additives to bottle 124A.

Mixing chamber 145 may be configured to be weighted via scale system 165. For scale system 165 to measure a weight of mixing chamber 145, mixing chamber may be configured to execute slight vertical motion 215A. For example, mixing chamber 145 may be supported by a suspension spring (e.g., spring 216) that may allow slight motion for mixing chamber 145. In various embodiments, at least some portions of conduits 141, 142, and 225 may execute slight vertical motions as well (e.g., motions 215B-215D, as shown in FIG. 2A). For example, conduits 141, 142, and 225 may have at least some sections formed from a flexible material capable of allowing vertical motion for portions of conduits 141 and 142. Similarly, motor 144 may execute vertical motion 215E as it may be connected to a power/signal supply by a flexible power/data cable 220. In an alternative embodiment, when motor 144 and mixing element 143 are detached from mixing chamber 145, motor 144 and mixing element 143 may not move together with motion of mixing chamber 145.

It should be noted that a range of vertical motions of mixing chamber 145 may be configured by selecting a stiffness of spring 216. It should be noted that spring 216 is only one example of connection allowing for slight vertical motion of mixing chamber 145. Other connections may include a rubber gasket, a pneumatic cylinder, and the like. In an example embodiment, mixing chamber 145 may be supported by spring 216 by attaching mixing chamber 145 to a portion of spring (e.g., a top portion 217 of spring 216) via connector 218 that is solidly attached to unit 167 of chamber 145. It should be noted that connector 218 and unit 167 may have any suitable shape and may be made from any suitable material (e.g., stainless steel, aluminum, and the like).

In various embodiments, scale system 165 may be configured to measure the weight of base 10 and purified water 12 entering mixing chamber 145 in order to correctly and consistently produce plant-base milk recipe. For example, if a plant-based milk recipe requires one-to-four ratio of base 10 to water 12 by weight, system 165 may be used to ensure that one-to-four ratio of base 10 to water 12 by weight is correctly maintained. For instance, kiosk 100 may be configured to pour a first predetermined amount of water 12 into mixing chamber 145 and then measure the weight of the poured water to verify that a correct amount of water 12 is in mixing chamber 145. Subsequently, kiosk 100 may be configured to pour a second predetermined amount of base 10, and then measure the weight of base/water mix 210. If, for example the weight of water 12 in mixing chamber 145 was measured as $W_w$ and the weight of base/water mix 210 in mixing chamber 145 is measured to be $W_m$ then weight of base 10 is calculated to be $W_B=W_m-W_w$ and ratio of $W_B/W_w$- may be $W_B/W_w=1/4\pm\epsilon$, where $\epsilon$ is an error. If $|\epsilon|<E_0$, i.e., the absolute value of error is less than a target value $E_0$, then the one-to-four ratio of base 10 to water 12 is achieved. For generality, we can use R for base-to-water ratio (e.g., R=1/4), and rewrite $W_B/W_w=R\pm\epsilon$. However, if error $|\epsilon|\geq E_0$ then plant-based milk recipe may be incorrect, and base/water mix 210 may be discarded. In various embodiments, nozzle 146 includes a nozzle valve 230 for preventing base/water mix 210 from pouring out of mixing chamber 145 prior to completion of mixing (including emulsifying) of base 10 and water 12. In an example embodiment, if $|\epsilon|\geq E_0$ kiosk 100 may be configured to prevent nozzle valve 230 from opening, and may be further configured to discard base/water mix 210 via a discard conduit 231 by opening a valve 232, as indicated in FIG. 2A.

Alternatively, kiosk 100 may be configured to execute a set of steps for correcting base-to-water ratio without discarding base/water mix 210 via discard conduit 231. For example, if $W_B/W_w=R-\epsilon_1$, kiosk 100 may be configured to add to base/water mix 210 an amount of base 10 having weight $W_w\epsilon_1$ to obtain the correct ratio $W_{NB}/W_w=R$ (here $W_{NB}$ is a new amount of base to distinguish from the previous amount of base $W_B$). It should be noted that dispensing small accurate amounts of base 10 may be more challenging than dispensing small accurate amounts of water 12, due to base 10 having high viscosity (and possibly flowing in clumps), which inhibiting fine flow control of base 10. On the other hand, due to low viscosity of water 12, fine flow control of water 12 may be possible. Thus, when $W_B/W_w=R-\epsilon_1$, kiosk 100 may be configured to add to base/water mix 210 an amount of base 10 having weight $W_w\epsilon_2>W_w\epsilon_1$. Upon addition of amount of $W_w\epsilon_2$ of base 10, the base-to-water ratio may become $W_{NB}/W_w=R+(\epsilon_2-\epsilon_1)$, (with $\epsilon_2>\epsilon_1$) indicating that there is more base 10 than what is required for correct recipe. The base-to-water ratio may then be corrected by adding water 12 in the amount of $(\epsilon_2-\epsilon_1)W_w/R$. In various embodiments, when base-to-water ratio is determined to be correct using scale system 165, the final amount of base/water mix 210 may be weighted, and extra amount of mix 210 may be discarded via conduit 232.

It should be noted that steps of adding base 10 and water 12 to obtain the correct base-to-water ratio may be iterated until the correct ratio is obtained. For example, water 12 may be added first, then base 10 may be added, then either base 10 or water 12 may be added to correct the base-to-water ratio. The process of adding base 10 or water 12 may be repeated several times until a correct base-to-water ratio is established.

In some embodiments, kiosk 100 may recalibrate valves for controlling dispensing base 10 or water 12 based on weight measurements obtained using system 165. For example, if a valve (e.g., valve 15, as shown in FIG. 2A) for dispensing base 10 is calibrated to dispense 100 grams of base 10, but according to weight measurements of system 165 dispenses 110 grams of base 10, valve 15 may be recalibrated (i.e., configured to dispense slightly less amount of base 10 to correctly dispense 100 grams of base 10. For example, valve 15 may be recalibrated by reducing the amount of time valve 15 is open, or by reducing a rate with which base 10 is transported via conduit 141 into mixing chamber 145 (the rate with which base 10 is transported depends on a pressure difference that moves base 10 through conduit 141).

In various embodiments, computing device 150 and scale system 165 may be configured to recalibrate an example valve in real-time. For example, device 150 may be configured to instruct valve 15 (or valve 17, as shown in FIG. 2A) to dispense a small target amount of base 10 (or water 12), by opening valve 15 (or valve 17) by a given amount and/or by providing a pressure difference across valve 15/17. Valve 15/17 may dispense a first amount of the material, and scale system 165 may be configured to measure the dispensed first amount of the material and provide measurements to computing device 150. If the first amount of the material does not match the target amount of the material, computing device 150 may adjust settings for valve 15/17 (e.g., increase a flow of material through valve 15/17, decrease the flow of the material thought valve 15/17 or keep valve 15/17 open for a longer/shorter period of time). Calibration steps described above may be repeated multiple times to yield required amount of the material to be dispensed by valve 15/17. In case, valve 15/17 is not capable in dispensing a right amount of the material within a given time interval (e.g., within ten seconds, twenty seconds, thirty seconds, forty seconds, forty-five seconds, fifty seconds, sixty seconds, and the like), valve 15/17 may be shut down and warning data may be reported by computing device 150 to an administrator of kiosk 100. It should be noted that calibration steps described in relation to valve 15 can be applied for any valve of kiosk 100.

In various embodiments, some (or all) of the malfunctioning of kiosk 100 (e.g., malfunctioning of valves, scale system 165, temperature sensors, refrigeration unit 193, compressor 151, and the like) may be reported by computing device 150 to the administrator of kiosk 100. Additionally, when supplies of kiosk 100 are running low (e.g., container 152 and 154 are low on base 10) computing device 150 may be configured to report shortage of supplies to a supplier of kiosk 100. Further operations of computing device 150 and reports of computing device 150 are discussed below.

To prepare a plant-based beverage, water 12 may be flowed first to mixing chamber 145, and scale system 165 may be configured to measure the weight of water 12 without the presence of base 10. Following the flow of the water into mixing chamber 145, base 10 may be introduced, and the weight of water 12 and base 10 may be measured again to deduce the weight of base 10. In various embodiments, base 10 may be introduced in small amounts, and the weight of base 10 may be measured recurrently to obtain the correct paste-to-water weight ratio. In some embodiments, base 10 may be introduced into an auxiliary weight/volume measuring container prior to mixing (including emulsifying) base 10 and water 12 in mixing chamber 145.

FIG. 2A shows that conduits 142 and 141 may be attached to mixing chamber 145, and thus contribute to the weight of mixing chamber 145 as measured by scale system 165. Further, when conduits carry base 10 and water 12 towards mixing chamber 145, dynamic forces associated with flows of base 10 and water 12 may affect the reading of scale system 165 and may introduce errors in weight measurement. The errors in weight measurement may be reduced by decoupling conduits 141 and 142, motor 144, mixing element 143, and enclosure of mixing chamber 145.

Figure 2B:
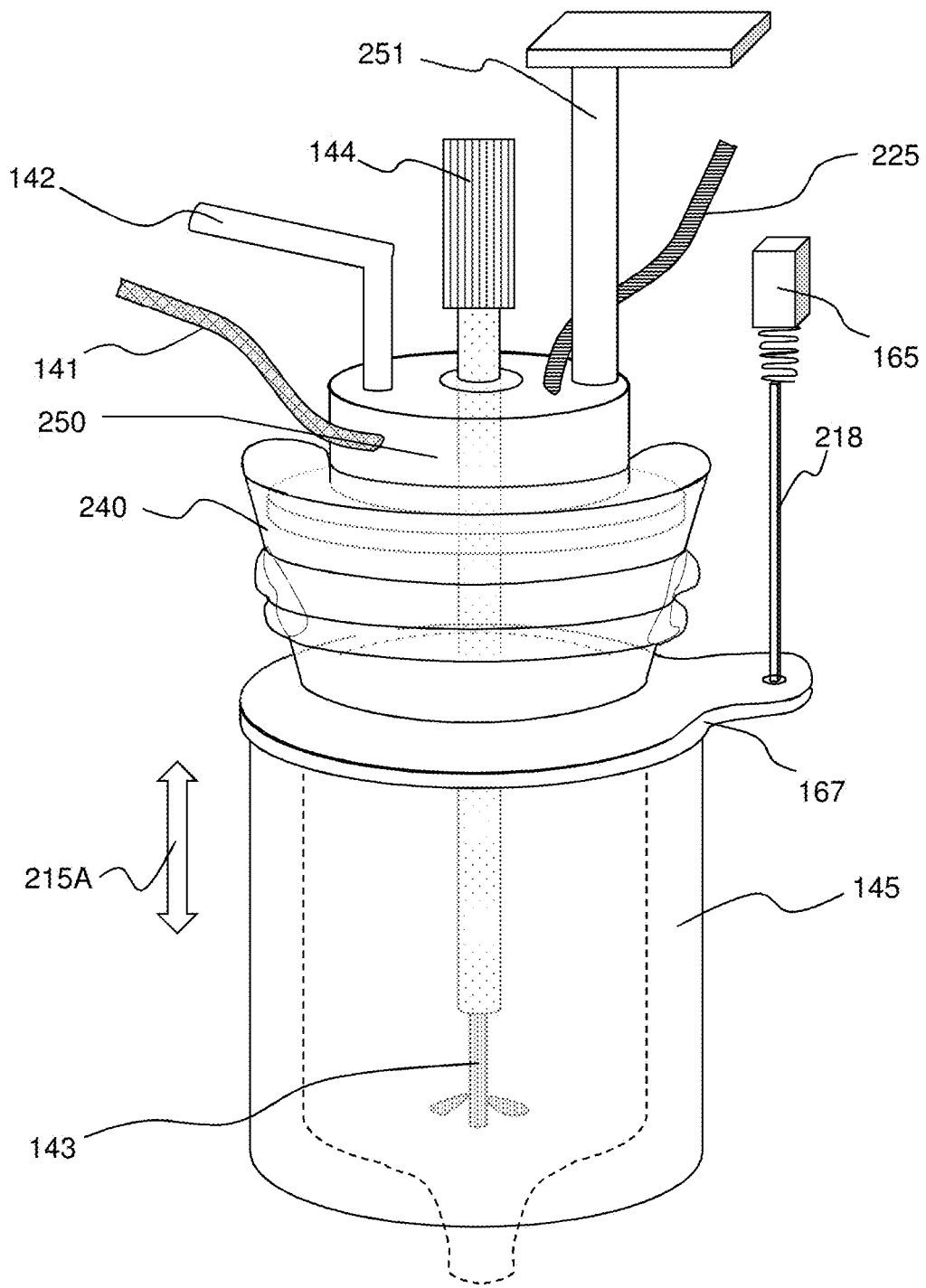
FIG. 2B is a schematic illustration of another example mixing chamber (capable of emulsifying) with an example bellow, consistent with embodiments of this disclosure.

In an example embodiment, shown in FIG. 2B, mixing chamber 145 may be suspended from a hub 250 via a bellow 240. Bellow 240 may be configured to stretch, and hub 250 may be solidly connected to a part of kiosk 100 via a connector unit 251. Since hub 250 is supported by connector unit 251, it does not contribute to the weight of mixing chamber 145, and neither elements (e.g., conduits 141, 142, and 225) connected to hub 250. Bellow 240 may allow slight motion of mixing chamber 145 as shown by arrow 215A, and the weight of mixing chamber 145 (and base/water mix 210) may be measured by scale system 165. Note that scale system 165, as shown in FIG. 2B may be configured differently than scale system 165, as shown in FIG. 2A. For example, it may be positioned above mixing chamber 145, and connector unit 218 may be positioned vertically, as shown in FIG. 2B. Further solid member 167 may have a different shape than the one shown in FIG. 2A, and may be located at a top portion of mixing chamber 145. The difference between scale system 165 of FIG. 2A and FIG. 2B are shown to illustrate various possible designs of system 165, and it should be understood that any other suitable variations are possible.

In various embodiments, base 10 or water 12 flow into hub 250 before pouring into mixing chamber 145 by means of gravity. In an example embodiment, hub 250 may include a funnel for directing the flow of base 10 and/or water 12 towards mixing chamber 145. In an alternative embodiment, hub 250 may not include a bottom and may only be configured to support conduits 141, 142, and 147.

Figure 3:
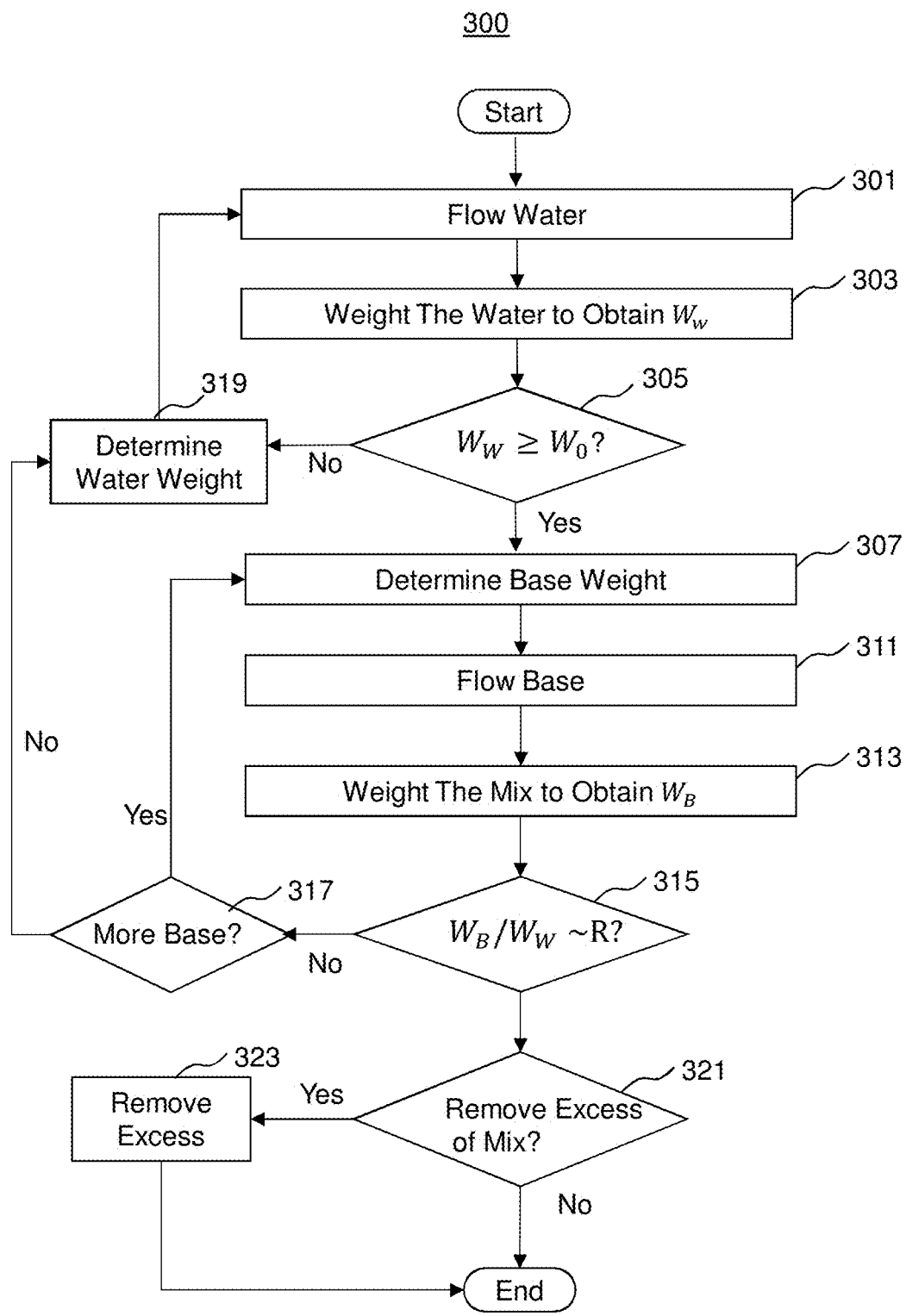
FIG. 3 is an example flowchart for determining base-to-water ration for a beverage, consistent with embodiments of this disclosure.

FIG. 3, shows an example process 300 for obtaining an appropriate base-to-water ratio for plant-based milk. At step 301 of process 300, computing device 150 may be configured to control valve 17 to flow a predetermined amount of purified water 12 into mixing chamber 145. Upon receiving water 12, at step 303, scale system 165 of mixing chamber 145 may weight the water 12 to obtain water weight $W_w$. At step 305, computing device 150 of kiosk 100 may determine if water weight $W_w$ is less than or equal to a target water weight $W_0$ that is required for correct recipe for a plant-based milk. If $W_w < W_0$ (step, 305, No), then process 300 may proceed to step 319 and determine an additional amount of water that needs to be added to ensure that $W_w \geq W_0$. Alternatively, if $W_w \geq W_0$ (step 305, Yes), process 300 may proceed to step 307, where computing device 150 may determine a target amount of base 10, for water of weight $W_w$, to yield a correct base-to-water ratio R. At step 311, computing device 150 may be configured to control valve 15 to flow a target amount of base 10 into mixing chamber 145. At step 313 mixing chamber 145 may receive base 10 and measure resulting weight of base/water mix $W_m$ using scale system 165. Further by subtracting $W_w$ from $W_m$, computing device 150 may be configured to calculate weight of base 10 as $W_B = W_m - W_w$. At step 315, computing device 150 may evaluate base-to-water ratio $W_B/W_w$ and compare it with a target ratio R. If $W_B/W_w \sim R$ (step 315, Yes) process 300 may proceed to step 321 at which computing device 150 may determine if an excess of plant-based milk needs to be removed from mixing chamber 145. If some of the plant-base mix 210 needs to be removed (step 321, Yes), process 300 may proceed to step 323 and remove excess of mix 210 via conduit 231, as shown in FIG. 2A. Alternatively, if mix 210 does not need to be removed from chamber 145 (e.g., mix 210 has a correct weight for dispensing into bottle 124A, as shown in FIG. 2A) at step 321, No, process 300 may be successfully completed. It should be noted that approximate sign in expression $W_B/W_w \sim R$ indicates that $W_B/W_w$ may not be equal to R precisely, but may deviate from R within a range of allowed values (e.g., within one to ten percent of value of R).

If correct base-to-water ratio is not obtained (step 315, No), process 300 may proceed to step 317 where computing device 150 determines if the additional amount of base 10 or additional amount of water 12 needs to be added to base/water mix 210 to obtain correct base-to-water ratio R. If additional amount of base 10 needs to be added (step 317, Yes), process 300 may proceed to step 307. Alternatively, if more water 12 needs to be added (step 317, No), process 300 may proceed to step 319, at which the amount of water may be determined by computing device 150. After completion of step 319, process 300 may proceed to step 301 and flow additional amount of water to mixing chamber 145.

In various embodiments, base 10 and water 12 may be premixed to form a concentrate in order to expedite the preparation of plant-based milk. For example, base-to-water concentrate of a suitable ratio (e.g., ratio of one, one half, one third, and the like) may be used to quickly mix base/water mix 210 in mixing chamber 145. In an example embodiment, concentrate may be prepared in a separate compartment with a precise base-to-water ratio and, when a request for a plant-based milk is received, the concentrate may be mixed with water in mixing chamber 145 to yield a required plant-based milk. In various embodiments concentrate may be maintained at a low temperature (e.g., a temperature that is slightly above freezing point) to prevent bacterial growth in a concentrate. The concentrate may be maintained for a short duration of time (e.g., an hour, few hours, one day, few days, and the like) and may be discarded if not used within the set duration of time. In various embodiments, several different types of concentrates may be used for different plant-based beverages.

Figure 4A:
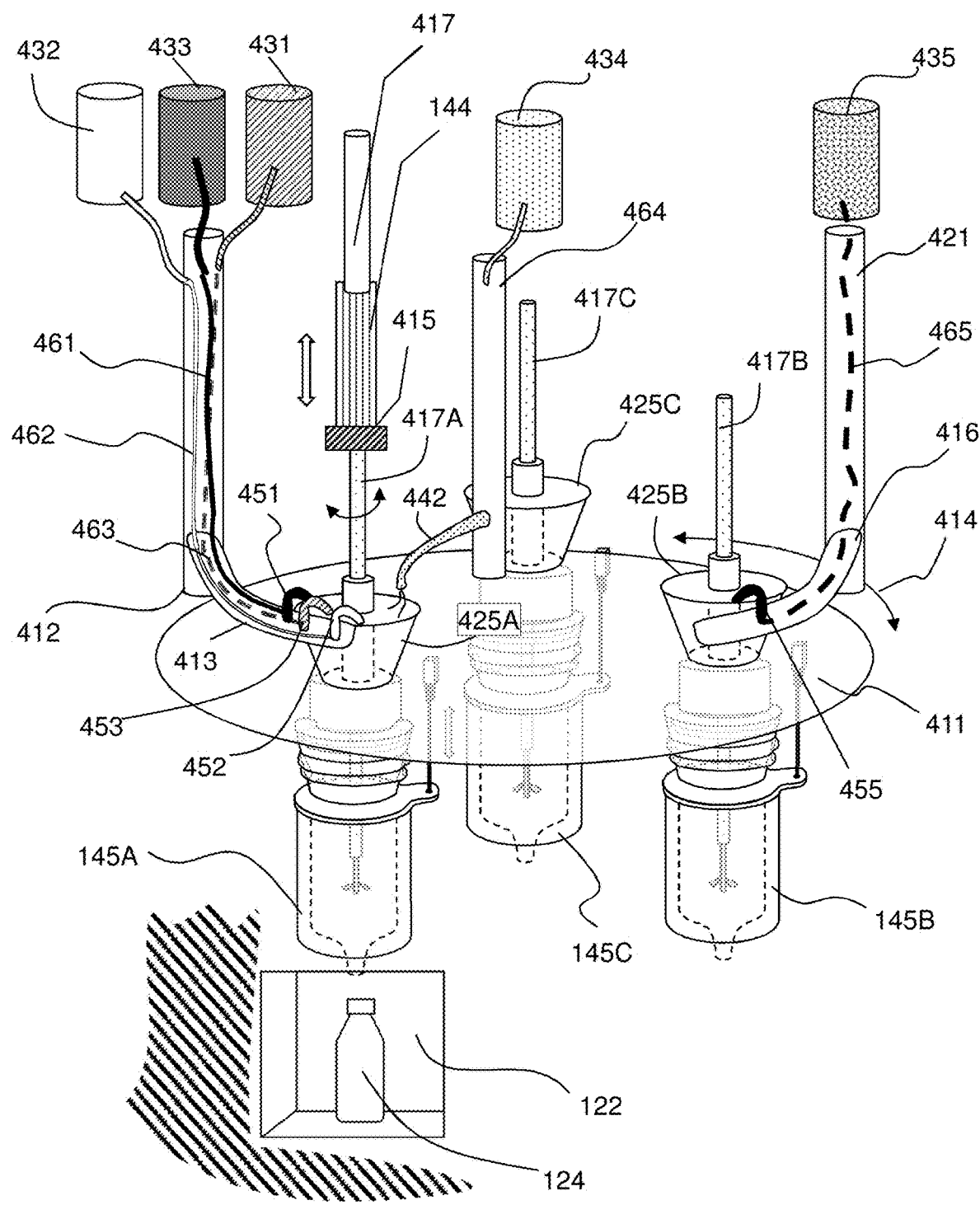
FIG. 4A is an example system containing multiple mixing chambers (all capable of emulsifying), consistent with embodiments of this disclosure.

FIG. 4A shows an example embodiment of a kiosk with several mixing chambers 145A-145C (all of which are capable of emulsifying the materials that they are mixing). Each mixing chamber may be dedicated to a particular type of milk. For example, chamber 145A may be used to prepare almond milk, chamber 145B may be used to prepare oatmeal milk, and chamber 145C may be used to prepare peanut milk. Note, that chamber 145C that prepares peanut milk cannot be used to prepare any other type of milk to prevent residual peanut particles from contaminating other types of plant-based milk, thus preventing a possible allergic reaction for users allergic to peanuts. In an example embodiment of kiosk 100, as shown in FIG. 4A, kiosk 100 may have a single enclosure 122 (contrary to multiple enclosures 122A and 122B, as shown in FIG. 1A), and mixing chambers 145A-145C, solidly connected to a turntable 411, may be rotated to be positioned above a bottle 124, as shown in FIG. 4A. In FIG. 4A, rotation of turntable is indicated by arrow 414, and the turntable may be rotated around a vertical axis (not shown) using a suitable motor controlled by computing device 150.

Figure 4B:
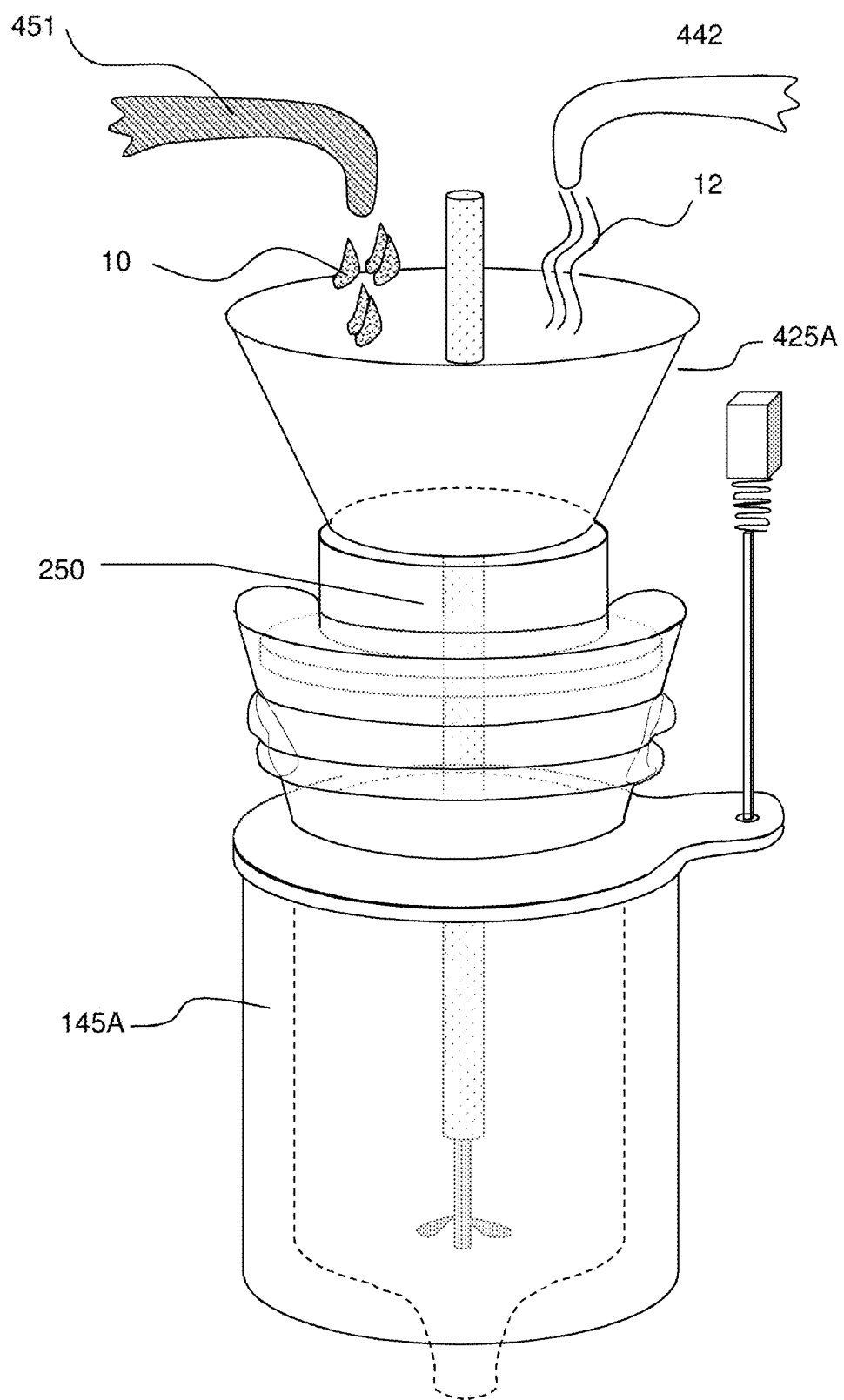
FIG. 4B is an example embodiment of a mixing chamber (capable of emulsifying) having a funnel unit, consistent with embodiments of this disclosure.

In an example embodiment, mixing chambers 145A-145C may have a similar design as mixing chamber 145 shown in FIG. 2B, with an exception that hub 250 does not include conduits 141, 142, and 147. The details of a modified mixing chamber (e.g., chamber 145A) are shown in FIG. 4B. Mixing chamber 145A, as shown in FIG. 4B, includes a funnel unit 425A for receiving base 10 and water 12 from corresponding taps 451 and 442. Taps 451 and 442 are positioned at a distance above funnel unit 425A such that mixing chamber 145A may be moved away from taps 451 and 442. For example, mixing chamber 145A may rotate away from taps 451 and 442 when turntable 411, as shown in FIG. 4A, is rotated.

Returning to FIG. 4A, a user may select a type of plant-based milk (e.g., almond milk), and a mixing chamber (e.g., chamber 145A used for almond milk) may be positioned above bottle 124. Containers 431-433 may contain various types of concentrates for different types of milks. For example, container 431 may be an almond milk concentrate, container 432 may be an oatmeal concentrate, and container 433 may be a peanut milk concentrate. When almond milk is selected by the user, computing device 150 may be configured to open a tap 451, and almond milk concentrate may be flown via a conduit 461 into funnel unit 425A of mixing chamber 145A. In various embodiments, conduits 461-463 for carrying different concentrates to corresponding taps 451-453 may be supported by unit 412 and arm unit 413. Units 412 and arm unit 413 may be positioned to ensure that they do not interfere with movements of funnel units 425A-425C as these funnel units are rotated with the rotation of turntable 411. As shown in FIG. 4A, purified water 12 may be flown from tap 442, via a pipe unit 464 from reservoir 434.

Figure 4C:
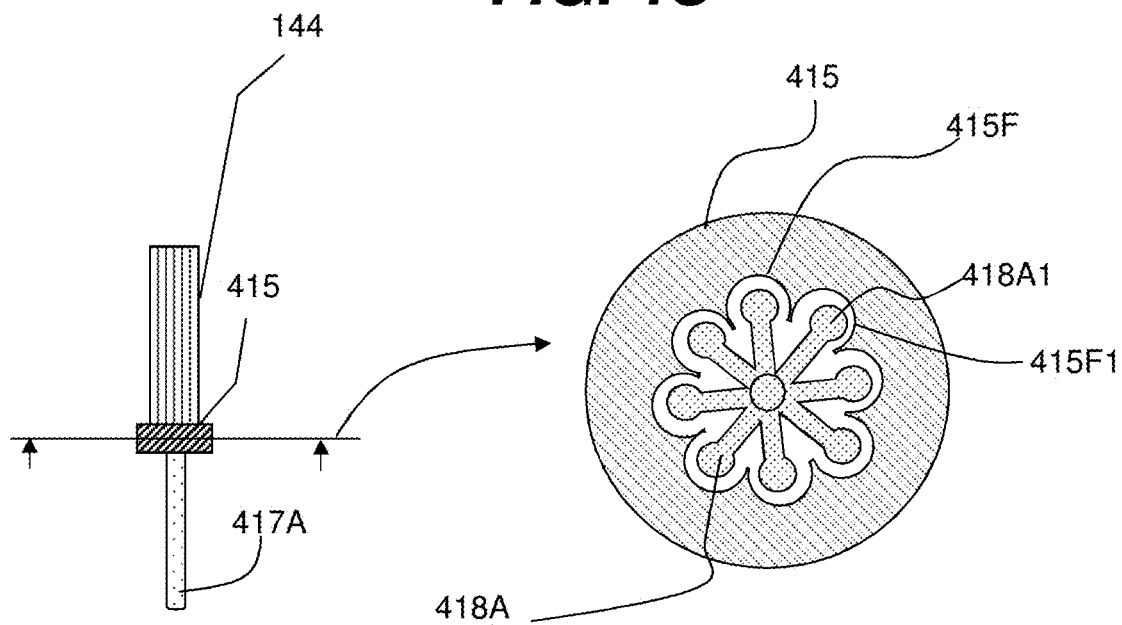
FIG. 4C is an example connection between a motor and a mixing element (capable of emulsifying), consistent with embodiments of this disclosure.

In an example embodiment, a motor 144 may be supported by a member 417, which may move motor 144 upwards/downwards and connect motor 144 with one of the mixing rods 417A-417C for mixing chambers 145A-145C. Mixing rods 417A-417C may be attached to corresponding mixing elements (e.g., mixing element 143 is illustrated in FIG. 2B). Motion of motor 144 in upwards/downwards direction allows to disconnect motor 144 from a mixing chamber and use motor 144 with a different mixing chamber (e.g., mixing chamber 145B) when mixing chamber 145B is rotated in a position above bottle 124. Motor 144 and a mixing rod (e.g., mixing rod 417A) may be connected using a connection element 415, as shown in FIG. 4A and FIG. 4C. FIG. 4C shows an example connection element 415 that includes an indentation 415F. A top portion of rod 417A may contain a flower unit 418A that can be inserted into a receiving flower-shaped indentation 415F of connection element 415. Flower unit 418A and indentation 415F may be designed to match upon rotation of indentation 415F relative to flower unit 418A. In an example embodiment, flower indentation 415F and unit 418A may include a large number of leaflets (e.g. 8 leaflets, of which leaflet 415F1 and 418A1 are shown in FIG. 4C) and flower indentation 415F and unit 418A may match after rotating connection element 415 relative to rod 417A by an angle (e.g., match after rotation by an angle that is smaller than 45 degrees). In various embodiments, motor 144 may exert some force towards rod 417A, such that upon matching indentation 415F and flower unit 418A, motor 144 locks with rod 417A.

Returning again to FIG. 4A, while mixing chamber 145A may be used for dispensing almond milk, other mixing chambers may be rinsed or cleaned. For example, mixing chamber 145B may be rinsed or cleaned using any suitable cleaning/rinse liquid delivered to chamber 145B from a reservoir 435 via a conduit 465, that may be placed within a supporting unit 421 and an arm unit 416, as shown in FIG. 4A. In an example embodiment, the cleaning/rinse liquid may be poured into chamber 145B via a tap 455 attached to arm unit 416. Similar to support unit 412 and arm unit 413, support unit 421 and arm unit 416 may be positioned such that they do not interfere with motion of chambers as they turn with turntable 411. Similarly, tap 442 and pipe unit 464 are positioned such that they do not impede motion of chambers 145A-145C. In an example embodiment mixing chamber 145 may be rinsed every five minutes, every ten minutes, every fifteen minutes, every twenty minutes, and the like. In some cases, mixing chamber 145 may be rinsed after every single use, after every two, three, four, five, ten, twenty uses, and the like. In some cases, mixing chamber 145 may be rinsed after one of a set number of uses or set duration of time.

Support units 412, 421, pipe unit 464, arm units 413 and 416, as well as turntable 411, may be made from any suitable materials that are durable and easily cleanable. Such materials may include stainless steel, aluminum, and aluminum alloys, copper, copper alloys, plastic, fluoropolymers, and the like. In some cases, various components shown in FIG. 4A may have antimicrobial surface coatings (e.g., fluorocarbons, $TiO_2$ containing coatings, and the like).

As described above, motor 144 may be configured to move up/down and connect with mixing rods 417A-417C. While such configuration allows for using a single motor 144, moving motor 144 up/down and connecting it with mixing rods 417A-417C may take some time. To expedite the preparation of a milk product, a mixing assembly (i.e., a mixing motor and a mixing element) may be part of hub 250, as shown, for example in FIG. 4B. For such configuration, mixing may be initiated as soon as base/water mix is introduced into a mixing chamber by the mixing assembly associated with the chamber.

Figure 4D:
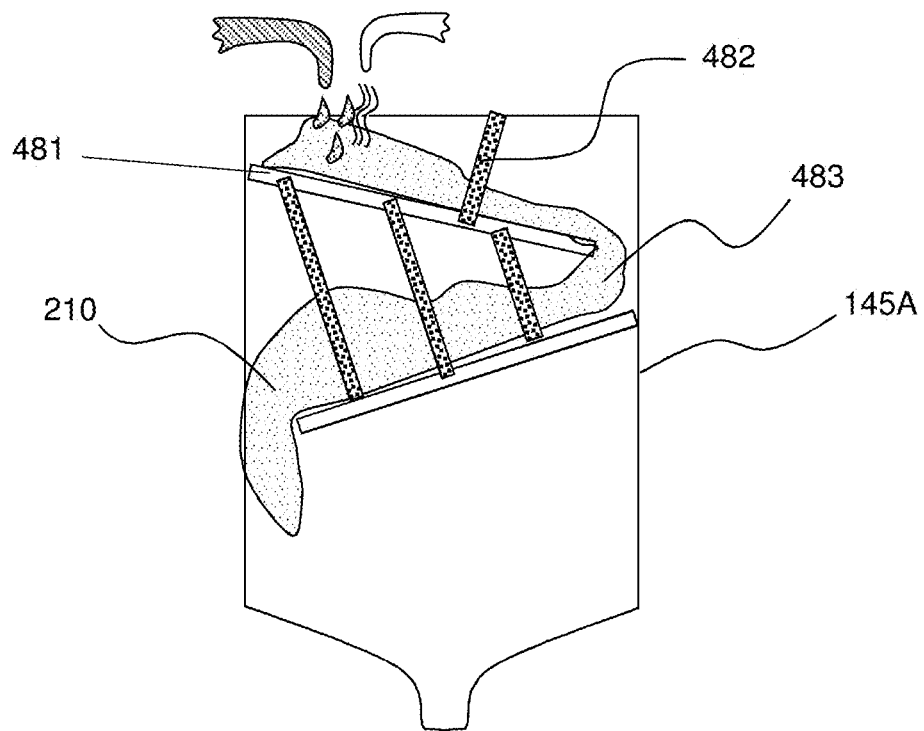
FIG. 4D is an example embodiment of a mixing chamber containing mixing elements that is capable of emulsifying, consistent with embodiments of this disclosure.

In some cases, when the flowable concentrate is mixed with purified water to produce a plant-based milk, no significant mixing, active mixing, or emulsifying is needed, and the naturally formed mix of flowable concentrate and purified water may be directly poured in bottle 124. In an alternative embodiment, mixing chambers 145A-145C may have a set of meshes that allow concentrate and purified water to mix. For example, FIG. 4D shows an example embodiment that includes mixing element 482 (e.g., a mesh) as well as slanted surfaces 481 for guiding a concentrate/water mix 483 within mixing chamber 145A and promoting mixing of concentrate and water. In various embodiments, mixing elements may have any suitable shape (e.g., mixing elements may have a circular, rectangular, or other cross-section). Mixing element 482 may include stationary (i.e., "static") components, such as a plurality of surfaces, blades, fins, or other protrusions. The components of mixing element 482 may be arranged in a predetermined uniform pattern or may be positioned in a non-uniform or random arrangement. The arrangement of components of mixing element 482 may be designed to achieve at least some mixing (or an optimum mixing) or agitation of mix 210. For example, the components of mixing element 482 may be designed or configured to cause separated constituents of mix 210 to be remixed, infused, or otherwise combined (i.e., to reduce or reverse separation) during passage through an element 482. In some embodiments, mixing element 482 may include a screen, mesh, grate, foam, or other structured component configured to cause agitation or turbulence in the material passing through a static mixer. Mixing element 482 may achieve mixing of the constituents of mix 210 without additional moving parts that could add cost and/or complexity to mixing chamber 145. In some embodiments, chamber 145 may not include mixing element 482. In other embodiments, chamber 145 may include multiple mixing elements.

Figure 5:
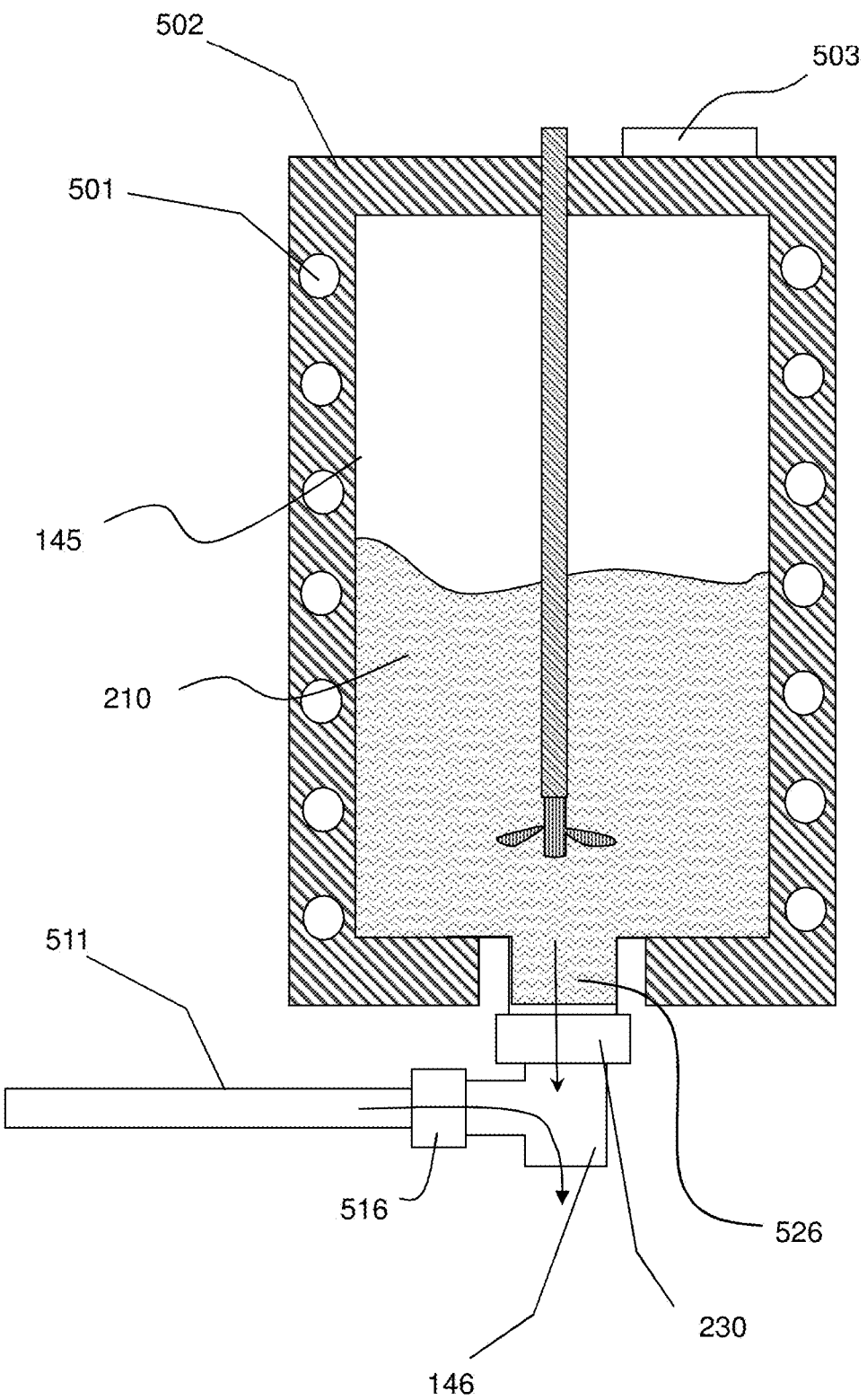
FIG. 5 is an example embodiment of a mixing chamber containing a cooling jacket that is capable of emulsifying, consistent with embodiments of this disclosure.

As previously discussed, mixing chambers 145A-145C may be cooled with coolant circulating within a cooling jacket. For example, FIG. 5 shows a cooling jacket 502 adjacent to walls of chamber 145. In various embodiments, cooling jacket 502 may be formed from a heat conductive material (e.g., copper, aluminum, stainless steel, aluminum/copper/magnesium alloys, and/or the like). Cooling jacket 502 may be conductively connected to the external surfaces of chamber 145, wherein the term "conductively connected" implies that the heat from chamber 145 may be conducted away from chamber 145 via jacket 502. In various embodiments, jacket 502 may include channels 501 for flowing cooling liquid (e.g., cooled water, coolant, etc.), for convectively transfer heat from jacket 502 to a heatsink/ambient environment or the like. In various embodiments, the rate of heat transfer from chamber 145 may be determined by the temperature of the flowing cooling liquid and by the flow rate of the cooling liquid. In various embodiments, both the temperature and flow rate of the flowing cooling liquid may be controlled by computing device 150. In some embodiments, jacket 502 may include a temperature sensor 503 for measuring temperature over an area of jacket 502. The data from sensor 503 may be used by computing device 150 to modify the cooling rate for chamber 145. In some embodiments, a beverage product within mixing chamber 145 may be maintained at a temperature in the range of 33-48 degrees Fahrenheit.

FIG. 5 shows opening 526, with valve 230 as well as conduit 511 with valve 516 for flowing an auxiliary product. In an example embodiment, the auxiliary product may include flavors, additives, food coloring, and the like. In various embodiments, a plant-based milk and the auxiliary product may be flown out towards a bottle via nozzle 146. In an example embodiment, valve 230 may be a unidirectional valve allowing base/water mix 210 (also referred to as a beverage product 210) to flow out of mixing chamber 145 and preventing the auxiliary product entering chamber 145. Similarly, valve 516 may be a unidirectional valve allowing the auxiliary product to exit from conduit 511 but preventing any other substance (e.g., beverage product 210) from entering conduit 511 that carries the auxiliary product.

As described before, kiosk 100 may include computing device 150 operably coupled to (e.g., electrically and/or electronically connectable to) one or more components of kiosk 100. Computing device 150 may include one or more components, for example, a memory device 696 and at least one processor device 698. Memory device 696 may be or include a non-transitory computer readable medium and may include one or more memory units of non-transitory computer-readable medium. Non-transitory computer-readable medium of memory device 696 may be or include any type of disk including floppy disks, optical discs, DVD, CD-ROMs, Microdrive, and magneto-optical disks, ROMs, RAMs, EPROMs, EEPROMs, DRAMs, VRAMs, flash memory devices, magnetic or optical cards, or any type of media or device suitable for storing computer-readable instructions and/or data. Memory units may include permanent and/or removable portions of non-transitory computer-readable medium (e.g., removable media or external storage, such as an SD card, RAM, etc.).

Non-transitory computer-readable medium associated with memory device 696 may also be configured to store logic, code, and/or program instructions executable by processor device 698 to perform any suitable embodiment of the methods described herein. For example, non-transitory computer-readable medium associated with memory device 696 may be configured to store computer-readable instructions that, when executed by processor device 698, cause the processor to perform a method comprising one or more steps. In some embodiments, the computer-readable instructions may be stored in or as one or more modules associated with one or more methods or processes. The methods performed by processor device 698 based on the instructions stored in the non-transitory computer readable medium may involve processing inputs, such as inputs of data or information stored in the non-transitory computer-readable medium of memory device 696, inputs received from input device, inputs received from sensory components (e.g., received directly from one or more sensors or retrieved from memory), and/or other inputs. The non-transitory computer-readable medium may be configured to store data sensed by one or more sensors for processing by processor device 698. In some embodiments, the non-transitory computer-readable medium can be used to store processing results produced by processor device 698.

Processor device 698 may include one or more processors (e.g., microprocessors) and may be or include a programmable processor (e.g., a central processing unit (CPU)). Processor device 698 may be operatively coupled to memory device 696 or another memory device configured to store programs or instructions executable by processor device 698 for performing one or more method steps. It is noted that the method steps described herein may be stored in memory device 696 and may be carried out by processor device 698 to cause the method steps to be performed.

Figure 6:
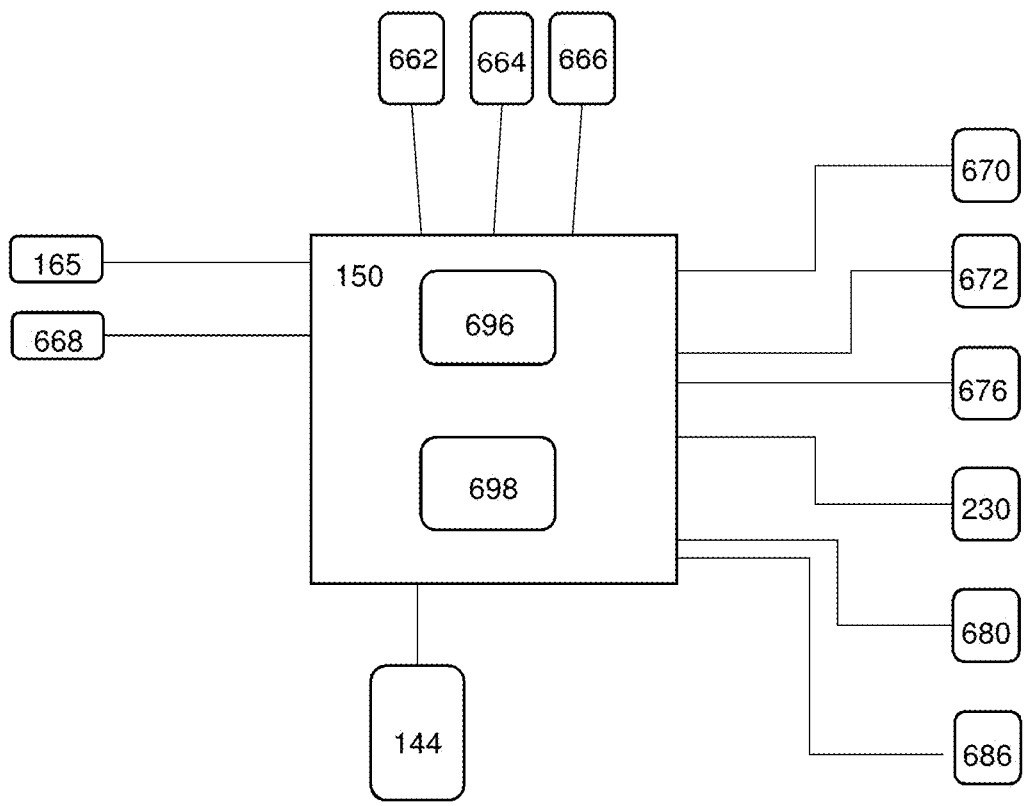
FIG. 6 is an example embodiment of a device for controlling the operation of a system for producing a food or beverage product, consistent with embodiments of this disclosure.

With reference to FIG. 6, in some embodiments, computing device 150 may be configured to monitor and/or control one or more components of kiosk 100. For example, device 150 may be connected to one or more temperature sensors configured to detect the temperature of one or more components or spaces within kiosk 100. For example, device 150 may be connected to a temperature sensor 662 (e.g., a first temperature sensor) associated with (e.g., connected to, in contact with, disposed on or within, etc.) storage containers for storing base 10 (e.g., storage container 152, as shown in FIG. 1C) and configured to sense or detect the temperature of base 10 within container 152.

Temperature sensor 662 may be electrically and/or electronically connected to computing device 150. Device 150 may be configured to receive a temperature measurement signal from temperature sensor 662 and control the temperature of the material within container 152 based on the temperature measurement signal from temperature sensor 662. For example, computing device 150 may be electrically and/or electronically connected to a cooling device (e.g., refrigeration unit 193, as shown in FIG. 1H) and configured to control an aspect of the cooling device to affect and control the temperature of material within container 152. For instance, device 150 may be configured (e.g., programmed with computer-readable instructions, connected to memory storing computer-readable instructions executable by electronic device 150, etc.) to control, for example, a valve, a power source, a motor, a pump, an electronic element, a fan, or other component of unit 193 in order to change or maintain the temperature of material within container 152. In this way, the separation of constituent elements of base 10 within container 152 may be inhibited or prevented.

Further computing device 150 may be connected to a temperature sensor 664 (e.g., a second temperature sensor) associated with (e.g., connected to, in contact with, disposed on or within, etc.) mixing chamber 145 (as shown for example in FIG. 2B), and configured to sense or detect the temperature of material (e.g., base 10, water 12, other ingredients, and combinations thereof) within mixing chamber 145. Temperature sensor 664 may be electrically or electronically connected to device 150. Device 150 may be configured to receive a temperature measurement signal from temperature sensor 664 and control the temperature of the material within mixing chamber 145 based on the temperature measurement signal from temperature sensor 664. For example, device 150 may be electrically or electronically connected to refrigeration unit 193 for cooling mixing chamber 145, and configured to control an aspect of the cooling device to affect and control the temperature of material within the mixing chamber 145. For instance, device 150 may be configured (e.g., programmed with computer-readable instructions, connected to memory storing computer-readable instructions executable by electronic device 150, etc.) to control, for example, a valve, a power source, a motor, a pump, an electronic element, a fan, or other component of unit 193 in order to change or maintain the temperature of base/water mix within mixing chamber 145. In this way, the material contained within and dispensed from mixing chamber 145 may be brought to or maintained at a suitable temperature for preserving food or beverage ingredients and/or for consuming products dispensed from mixing chamber 145.

Computing device 150 may further be connected to a temperature sensor 666 (e.g., a third temperature sensor) associated with (e.g., connected to, in contact with, disposed on or within, etc.) a water tank (e.g., water storage tank 191, as shown in FIG. 1H) and configured to sense or detect the temperature of water within or drawn from water tank 191. Temperature sensor 666 may be electrically or electronically connected to device 150. Device 150 may be configured to receive a temperature measurement signal from temperature sensor 666 and control the temperature of water within or drawn from tank 191 based on the temperature measurement signal from temperature sensor 666. As described above, device 150 may be electrically or electronically connected to unit 193, that among other things, is used for cooling water in water tank 191. As described above, device 150 may be configured to control, for example, a valve, a power source, a motor, a pump, an electronic element, a fan, or other components of unit 193 in order to change or maintain the temperature of water within or drawn from water tank 191. In this way, material mixed with water from water tank 191 may be brought to or maintained at a suitable temperature for preserving food or beverage ingredients and/or for consuming products dispensed from mixing chamber 145.

Further, information about weight from scale system 165 may be used by device 150 to sense or detect the weight of the material (e.g., water 12, base 10, other ingredients, combinations thereof, etc.) within mixing chamber 145, as shown in FIG. 2B. In various embodiments, data from system 165 may be received by device 150, and device 150 may be configured to control the weight of base/water within mixing chamber 145 in response to weight information received from system 165. For example, device 150 may be electrically or electronically connected to a valve 670, as schematically shown in FIG. 6, (e.g., a first valve) configured to control the passage of base from container 152 to mixing chamber 145. Further, device 150 may be connected to another valve 672 (e.g., a second valve) configured to control the passage of water 12 from water storage tank 191 to mixing chamber 145 and configured to control the base/water ratio and overall weight of a base/water mix within mixing chamber 145. For instance, computing device 150 may be configured (e.g., programmed with computer-readable instructions, connected to memory storing computer-readable instructions executable by device 150, etc.) to control, for example, a valve (e.g., valve 670 for adding base 10 from container 152, valve 672 for adding water 12 from water tank 191, etc.), a motor, a pump, an electronic element, or other component of kiosk 100 in order to change or maintain the weight of material within mixing chamber 145. In this way, the dosing (i.e., addition) of material (e.g., base 10, water 12, etc.) into mixing chamber 145 may be controlled according to predetermined recipe specifications and/or to prevent overfilling of mixing chamber 145.

Computing device 150 may be connected to a level sensor 668 (e.g., a first level sensor) associated with (e.g., connected to, in contact with, disposed on or within, etc.) mixing chamber 145 and configured to sense or detect the level of material (e.g., water 12, base 10, other ingredients, combinations thereof, and the like) within mixing chamber 145. Level sensor 668 may be electrically or electronically connected to device 150. Device 150 may be configured to receive a level measurement signal from level sensor 668 and control the level of material within mixing chamber 145 based on the level measurement signal from level sensor 668.

Computing device 150 may also be configured (e.g., programmed with computer-readable instructions, connected to a memory storing computer-readable instructions executable by device 150) to control a valve 230, as shown in FIG. 5 (e.g., a third valve) for controlling the dispensing of material from mixing chamber 145 into bottle 124, as shown in FIG. 4A. Device 150 may be configured to operate valve 230, for example, for predetermined periods of time in order to dispense corresponding predetermined amounts of plant-based milk into bottle 124. In some embodiments, device 150 may be configured to automatically determine an amount of time to open valve 230 (e.g., based on detected, sensed, determined, or otherwise input quantities of material admitted into mixing chamber 145) for dispensing a right amount of plant-based milk into bottle 124.

Further, computing device 150 may be configured to control a valve 676 (e.g., a fourth valve) for controlling the exposure of mixing chamber 145 to a low-pressure source. Device 150 may be configured to operate valve 676 to control the pressure within mixing chamber 145 to control the reduction of foam inside mixing chamber 145 during mixing operations. Also, computing device 150 may be configured to control a valve 686 (e.g., a fifth valve) for controlling a flow of a cleaning/sanitizing agent for cleaning different components of kiosk 100. It should be noted that various other valves may be further controlled by computing device 150.

Further, computing device 150 may be connected to a pressure sensor 680 associated with (e.g., connected to, disposed within, etc.) mixing chamber 145 and configured to generate a pressure measurement signal. Device 150 may be configured to control valve 676 and or components of a low pressure source (e.g., a pump, a motor, a power source, a valve, etc.) based on the pressure measurement signal from pressure sensor 680 to control the pressure within mixing chamber 145, for example, to cause the pressure to match a set pressure value.

Further, device 150 may be configured to control motor 144, as shown, for example in FIG. 2B. For example, device 150 may control the rotational speed of motor 144 (e.g., rotational speed may be in the range of 5000-6000 rpm) to reduce foaming and produce a well-mixed plant-based milk. Additionally, device 150 may control a duration of mixing (including emulsifying), torque of motor 144, and any other suitable aspects of motor 144.

In various embodiments, computing device 150 may be configured to receive, collect and save (e.g., in memory) data (e.g., measurement data) collected (i.e., sensed or measured) via various temperature, weight, and pressure sensors of kiosk 100. Device 150 may be configured to monitor data collected via various sensors and determine whether and/or when any data is indicative of a fault or error. For example, device 150 may be configured to compare data values to stored reference values and determine whether and/or by how much the data differs mathematically from the reference's values. Device 150 may be configured to generate a signal indicative of an error when the difference between sensed or measured data is equal to, greater than, or less than a reference value by a predetermined amount (i.e., by an amount equal to an error value). Error values may be determined empirically or may be assumed, presumed, or adopted based on known information, for example, information about system components provided by component manufacturers or based on prior testing results.

In some embodiments, data collected via the sensors of kiosk 100 may be used to determine when the supply or reserve of one or more ingredients dispensable by kiosk 100 is running low (i.e., when the stored or reserved quantity is below a threshold amount) or is exhausted. For example, computing device 150 may be configured to monitor the weight of base 10 or level of base 10 within container 152 and determine whether and/or when base 10 within container 152 is running low or is exhausted.

In various embodiments, computing device 150 may be electrically and/or electronically connected to a communication device (e.g., a radio transceiver) and may be configured to communicate error signals or error messages based on determined error values (such as any of the error values discussed above) to a remote communication device (e.g., a remote computer, mobile phone, server, etc.). The communication device may be a communication device configured to send and/or receive messages via a radio communication protocol, such as WiFi, CDMA, 3G, 4G, LTE, Bluetooth, nearfield communication (NFC), or via a wired communication system, such as telephone, cable, fiber optics, or other connections. In some embodiments, device 150 may be accessible via the Internet by a local or remote computing device (e.g., a computer, mobile device, tablet, proprietary hardware, etc.). In this way, any data sensed by the sensors of kiosk 100 or stored by or within computing device 150, error signals or messages, other diagnostics, and/or data metrics may be accessed by owners, operators, and/or technicians of kiosk 100. In some embodiments, device 150 may be configured to allow remote access via the electronic communication mechanisms described above for accessing and manipulating system control settings (e.g., temperature set points, pressure set points, dosing quantities, etc.). In some embodiments, computing device 150 may be configured to automatically send messages, consistent with the description above, indicative of low or exhausted supplies of materials to a remote communication device to effectuate automatic ordering of materials.

Mixing chamber 145, as shown in FIG. 2B, may be periodically cleaned to maintain required sanitary conditions within the enclosure of chamber 145. In an example embodiment, mixing chamber 145 may be cleaned depending on an interval of time since the last use of kiosk 100. For example, chamber 145 may be rinsed with water every ten minutes when kiosk 100 is inactive (i.e., is not engaged in dispensing a beverage product). In an example embodiment, hot water with water temperatures above 100° F. may be used. It should be noted that an interval of time of ten minutes is only illustrative, and any other appropriate interval time of inactivity may be selected as a duration of time, after which kiosk 100 may need to be rinsed. In some cases, kiosk 100 may be rinsed for a selected duration of time that may depend on a variety of factors such as the frequency of use of kiosk 100, the type of base 10 used for preparing the beverage product, the temperature of the mixing chamber 145, ambient humidity, and the like.

In some embodiments, as previously discussed, kiosk 100 may optionally include a clean-in-place (CIP) system 170 for cleaning and/or sanitizing components of kiosk 100, as shown in FIG. 1H. For example, CIP system 170 may include a cleaning material source configured to store a cleaning material. CIP system 170 may be configured to introduce a cleaning material into parts of kiosk 100, for example, by admitting cleaning material into the water supply conduit connected to mixing chamber 145 (as shown in FIG. 1H). It is contemplated that the cleaning material source may be used to clean different components of kiosk 100, such as, for example, various conduits that carry water. Computing device 150 may be configured to operate various valves and/or the water supply to automatically administer cleaning material or in response to an explicit command by a user (e.g., received via an interface 120A).

In various embodiments, CIP system 170 may include periodic internal cleaning and may include a fully automated system with programmable logic controllers, multiple tanks, sensors, valves, heat exchangers, data acquisition, and specially designed spray nozzle systems.

In an example embodiment, components of kiosk 100 may be cleaned with CIP cleaner such as AFCO 5229, AFCO 2548, 5222 HD CIP 20, AFCO 5235 Super CIP 200 and/or the like, and sanitized with CIP sanitizer such as AFCO 4325, PER OX SAN, AFCO 4312 VIGILQUAT and/or the like.

In some embodiments, the rinse cycle may include rinsing with hot water. For example, the water temperature may be between 30 to 100 degrees Celsius. In some cases, the rinse cycle may include dispensing water vapor inside mixing chamber 145, as shown in FIG. 2B. For example, in order to eliminate bacteria, water vapor at temperatures of about ten-to-few hundred degrees Celsius or higher may be used. In some cases, multiple rinse cycles may be used with water temperature being different between different cycles. In some embodiments, various other sanitizing techniques may be used to clean/disinfect inside surfaces of mixing chamber 145. For example, in some embodiments, a hot air (air of temperatures of about ten-to-few hundred degrees Celsius) may be dispensed within mixing chamber 145. In some embodiments, mixing chamber 145 may be irradiated by UV radiation in order to disinfect surfaces of chamber 145.

It should be noted that UV radiation may be used for disinfection of various surfaces of components of kiosk 100. For example, UV radiation may be used to disinfect various conduits (e.g., conduits 141 and/or 142) as well as a region of kiosk 100 in proximity of nozzle 146, as shown in FIG. 2A. In some embodiments, plant-based beverage product (e.g. mix 210, as shown in FIG. 2A) may be irradiated by UV radiation to decrease the presence of microorganisms within the product. For example, the mix 210 may be placed in a UV transparent enclosure and may be irradiated with UV radiation in a wavelength range of 240-310 nanometers. The transparent enclosure may be formed from a UV transparent material such as quartz or fluoropolymer (e.g., EFEP, ETFE, and the like).

In some embodiments, when deeper cleaning is required, the rinse cycle may be followed by a dose cleaning cycle. The dose cleaning cycle may involve surfactants such as anionic surfactants (e.g., alkylbenzene sulfonates, alkyl sulfates, alkyl ether sulfates, and/or the like) or other surfactants (e.g., amphoteric or nonionic), caustic soda, and/or the like. In some cases, surfactants may be delivered via conduit 225 and sprayed over internal walls of mixing chamber 145 using any suitable approaches (e.g., using spray balls). In various embodiments, the deep cleaning cycle may be followed by a rinse cycle. In some embodiments, during the dose cleaning cycle mixing element 143 may be activated in order to mix liquids (e.g., water with surfactants) dispensed into mixing chamber 145 during the dose cleaning cycle.

In some embodiments, a sanitizing cycle may be used. The sanitizing cycle may involve a sanitizing solution that may include sanitizing agents such as peracetic acid, chlorine, bromine, peroxides (e.g., hydrogen peroxide solution), and/or the like. In some cases, sanitizing agents may be delivered via conduit 225 and sprayed over internal walls of mixing chamber 145 using any suitable approaches (e.g., using spray balls). In various embodiments, the sanitizing cycle may be followed by a rinse cycle. In some embodiments, during the sanitizing cycle mixing element 143 may be activated in order to mix liquids (e.g., sanitizing solution) dispensed into mixing chamber 145 during the sanitizing cycle. During a cleaning cycle, an outlet 146, as shown in FIG. 2A, may be closed using a valve (e.g., valve 230, shown in FIG. 5) in order to prevent cleaning liquids leaking out of chamber 145.

Figure 7:
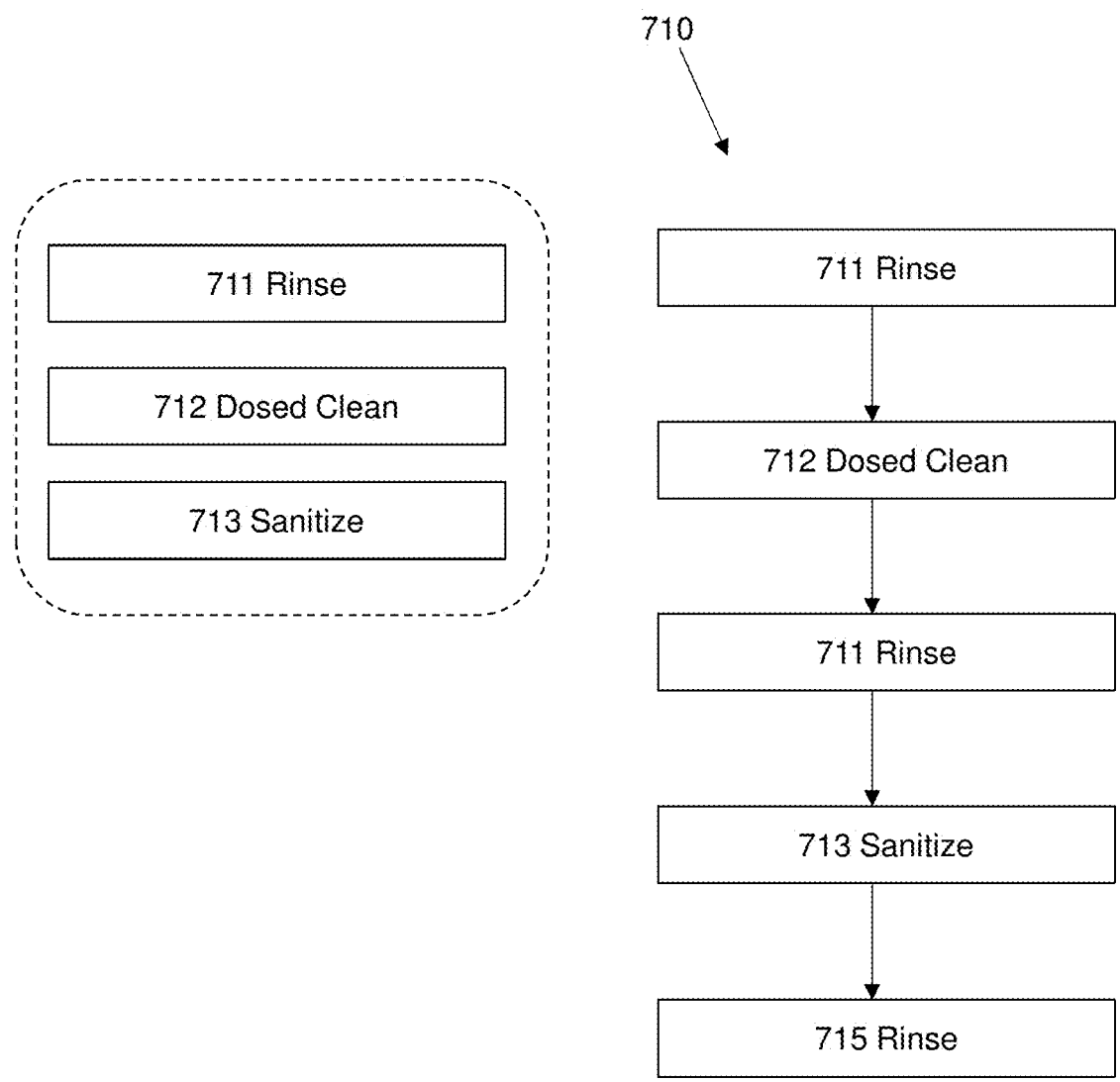
FIG. 7 is an example flowchart of an illustrative process of cleaning a dispensing system, consistent with disclosed embodiments.

FIG. 7 shows that cleaning of mixing chamber 145 may involve steps of rinsing chamber 145 (a step 711), dose cleaning chamber 145 (a step 712), and sanitizing chamber 145 (a step 713). Steps 711-713 may be used in any suitable combination. The last step during the cleaning of mixing chamber 145 may be step 711 (i.e., rinsing of chamber 145). In an example embodiment, FIG. 7 shows a process 710 for cleaning chamber 145 with a series of steps 711-715, executed one after another. It should be noted that any other suitable sequence of steps 711-715 may be used.

Figure 8:
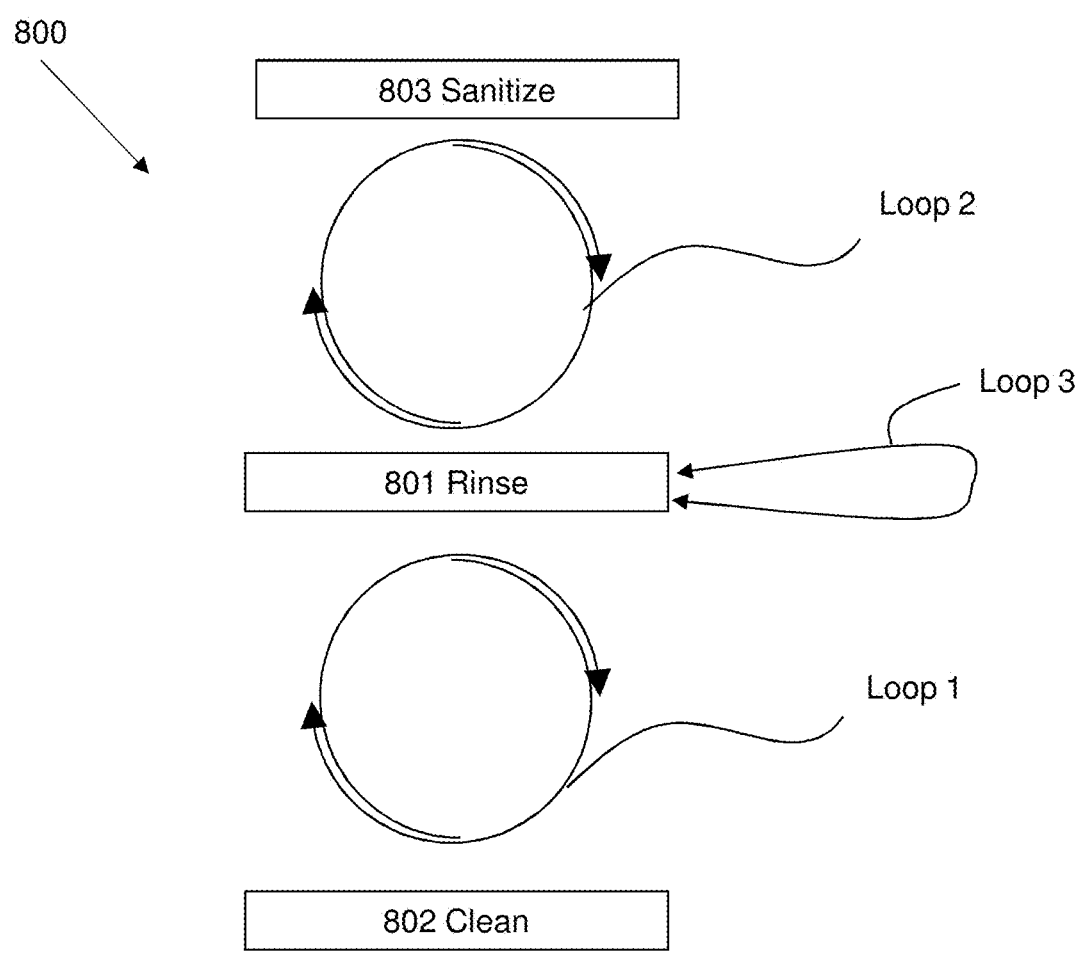
FIG. 8 is an example process of cleaning a dispensing system, consistent with disclosed embodiments.

In various embodiments, the process of cleaning components of kiosk 100 may be described by a process 800 shown in FIG. 8. At step 801 of process 800, the system may be first pre-rinsed with water (e.g., purified water, water treated with disinfectants, heat or UV radiation, etc.) that may be performed to wet the interior surface of the mixing chamber 145, conduits 142, as well as mixing element 143, and remove residue. In some cases, conduit 141 may be cleaned as well.

At step 802, a CIP cleaner may be introduced into the components of kiosk 100 (e.g., into mixing chamber 145, and conduits 141 and 142). In some embodiments, a doser may select the required dose (e.g., volume) for CIP cleaner prior to the introduction of the cleaner into the components kiosk 100. In various embodiments, CIP concentrated cleaner may be diluted prior to being used for cleaning the components of kiosk 100. In various embodiments, CIP cleaner and/or water for diluting the cleaner may be maintained at room temperature or be heated to a suitable temperature. The dose of concentrated CIP cleaner may be measured and controlled by any suitable means, including, for example, a Venturi System and can be delivered to the components of kiosk 100 via a doser/venturis. In various embodiments, CIP cleaner may be forced at high pressure/speed into the components of kiosk 100. Various valves may be opened or closed to control the output of pre-determined concentrations of CIP cleaner from the doser/venturis into mixing chamber 145. In various embodiments, CIP cleaner may include surfactants and caustics.

In various embodiments, process 800 may include one or more iterations between steps 801 and 802 schematically indicated by a loop 1 in FIG. 8. For example, process 800 may include a single sequence of step 801 (rinse step) and step 802 (clean step), or it may include several repeats of this sequence. Once loop 1 is completed, at step 803, the components of kiosk 100 may be sanitized. For example, at step 803, a CIP sanitizer may be introduced into the components of kiosk 100 (e.g., into mixing chamber 145, conduits 141 and 142). In some embodiments, a doser may select the required dose (e.g., volume) for CIP sanitizer prior to the introduction of the sanitizer into the components of kiosk 100. In various embodiments, CIP concentrated sanitizer may be diluted prior to being used for cleaning the components of kiosk 100. In various embodiments, CIP sanitizer and/or water for diluting the cleaner may be maintained at room temperature or be heated to a suitable temperature. The dose of concentrated CIP sanitizer may be measured and controlled by any suitable means, including, for example, a Venturi System and can be delivered to the components of kiosk 100 via a doser/venturis. In various embodiments, CIP sanitizer may be forced at high pressure/speed into the components of kiosk 100. Various valves may be opened or closed to control the output of pre-determined concentrations of CIP sanitizer from the doser/venturis into mixing chamber 145. In various embodiments, CIP sanitizer may include peracetic acids. In an example embodiment, CIP sanitizer may be left in mixing chamber 145 all the way down to the outlet 146 overnight to ensure no microbial growth.

In various embodiments, process 800 may include one or more iterations between steps 801 and 803 schematically indicated by a loop 2 in FIG. 8. For example, process 800 may include a single sequence of step 801 (rinse step) and step 803 (sanitize step), or it may include several repeats of this sequence. Once loop 2 is completed, the last cleaning step may be rinsed step 801 that may be followed by blowing air through the components of kiosk 100 and drying the components.

Critical parameters must be met and remain within the specification for the duration of the cycle. If the specification is not reached or maintained, cleaning will not be ensured and will have to be repeated. Critical parameters include temperature, flow rate/supply pressure, chemical concentration, chemical contact time, and final rinse conductivity (which shows that all cleaning chemicals have been removed).

In various embodiments, kiosk 100 may be cleaned several times during the day. For example, the system may be cleaned in the morning, mid-day, and at night. In various embodiments, mixing chamber 145 may be cold water rinsed as often as 5-20 minutes of kiosk 100 inactivity.

Figure 9:
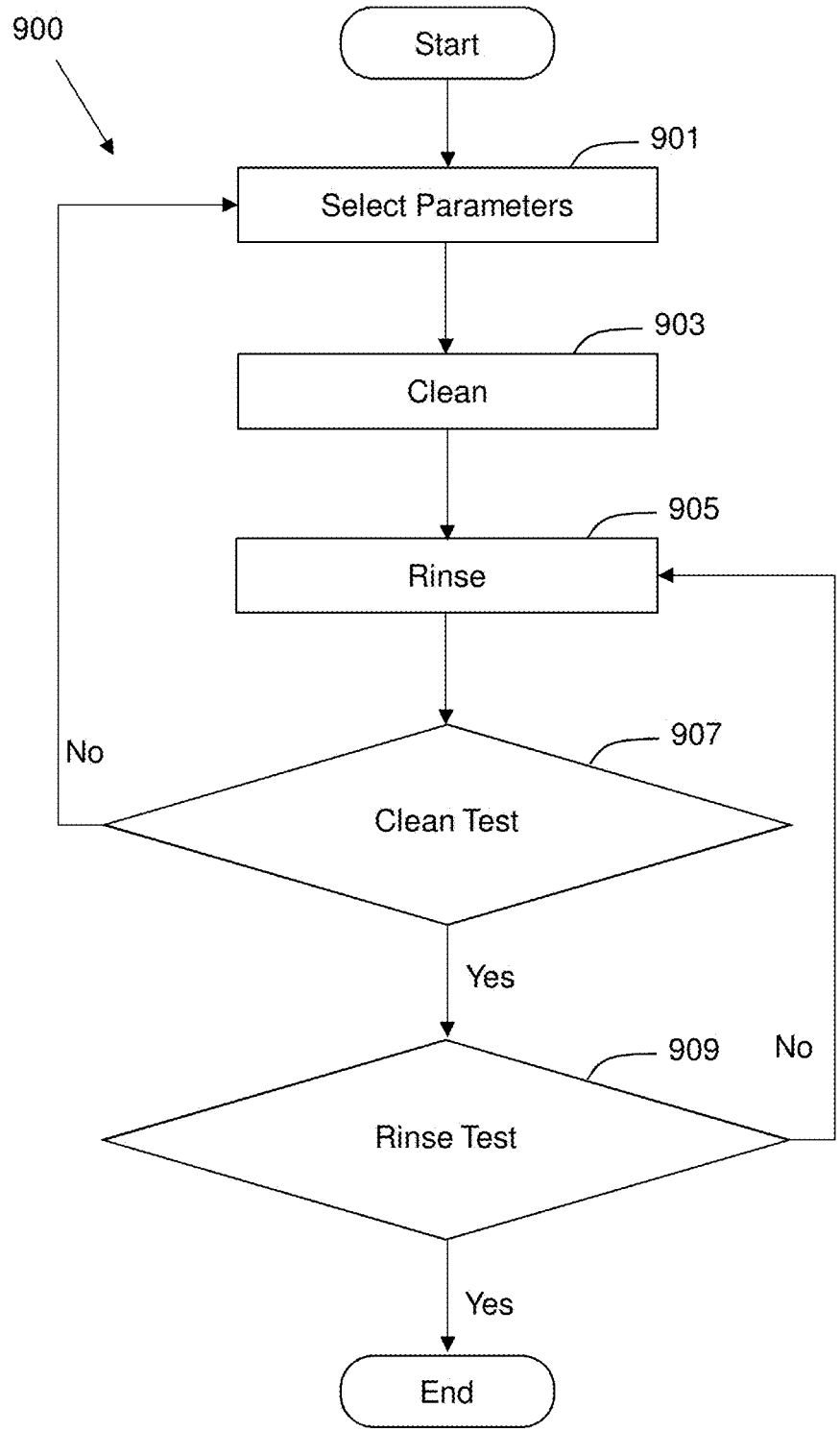
FIG. 9 is another example process of cleaning a dispensing system, consistent with disclosed embodiments.

FIG. 9 shows an example process 900 for cleaning kiosk 100 consistent with disclosed embodiments. At step 901 of process 900, kiosk 100 may be configured to select parameters for cleaning. Such parameters may include a temperature of the water being used for cleaning kiosk 100 or/and concentration of cleaning chemicals. It should be noted that parameters for cleaning may be determined based on the cleaning requirements and requirements on chemicals, as well as the concentration of chemicals used during the cleaning process. At step 903, CIP system 170 may clean kiosk 100 using any of the suitable approaches, including the approaches described above. At step 905, the CIP system may rinse kiosk 100 using any of the suitable approaches, including the approaches described above. At step 907, the CIP system may perform a cleaning test. The cleaning test may use any of the suitable approaches for determining if components and surfaces of kiosk 100 or kiosk 100 are cleaned. In an example embodiment, a clean test may be a reflectivity test (e.g., measurement of reflectivity of various surfaces and comparing reflectivity with predetermined values). For example, the reflectivity of surfaces may be altered due to the presence of the microbial film. Additionally, or alternatively, various visual tests may be performed for detecting microbial growth or for detecting surfaces that may need to be cleaned. For example, the visual test may include capturing images of surfaces and identifying using a computer-based model presence of contamination on various surfaces of kiosk 100. In some embodiments, a fluorescent test may be performed to determine the presence of the microorganisms. For example, a UV radiation (e.g., radiation in a wavelength range of 250-500 nm) may be used to determine the presence of microbial contamination based on fluorescent radiation emitted by microorganisms when exposed to UV radiation. If a clean test is not successful (step 907, No), CIP system may be configured to return to step 901 and repeat the cleaning process. If the clean test is successful (step 907, Yes), the CIP system may be configured to perform a rinse test at step 909. Rinse test determines if kiosk 100 is adequately rinsed (i.e., if cleaning chemicals are not present in the system). The rinse test may be conducted using any of the suitable approaches, such as using conductivity analysis. The conductivity analysis can help confirm that the rinse process is successful (e.g., most of all cleaning chemicals are removed). Since the various cleaning solutions are more conductive than the water used for flushing, conductivity measurement is a logical way to monitor the cleaning steps and the final rinse. If the rinse test is successful (step 909, Yes), CIP system may conclude the cleaning process, and if the rinse test is not successful (step 909, No) CIP system may be configured to return to rinse step 905 and repeat step 905 and subsequent tests at steps 907 and 909.

Figure 10:
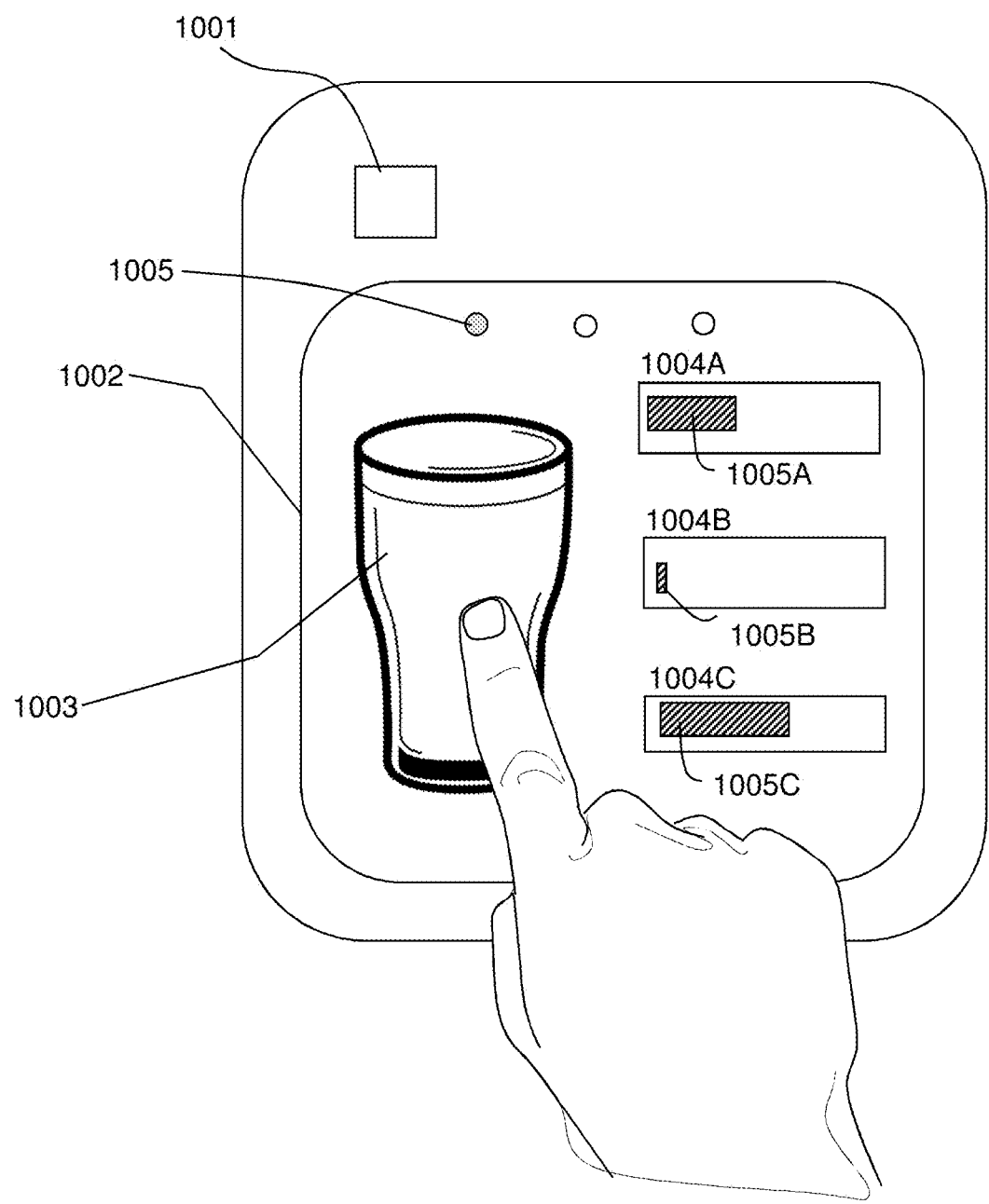
FIG. 10 is an example user interface for a dispensing unit for dispensing a dairy-free base beverage product, consistent with embodiments of this disclosure.
Figure 11:
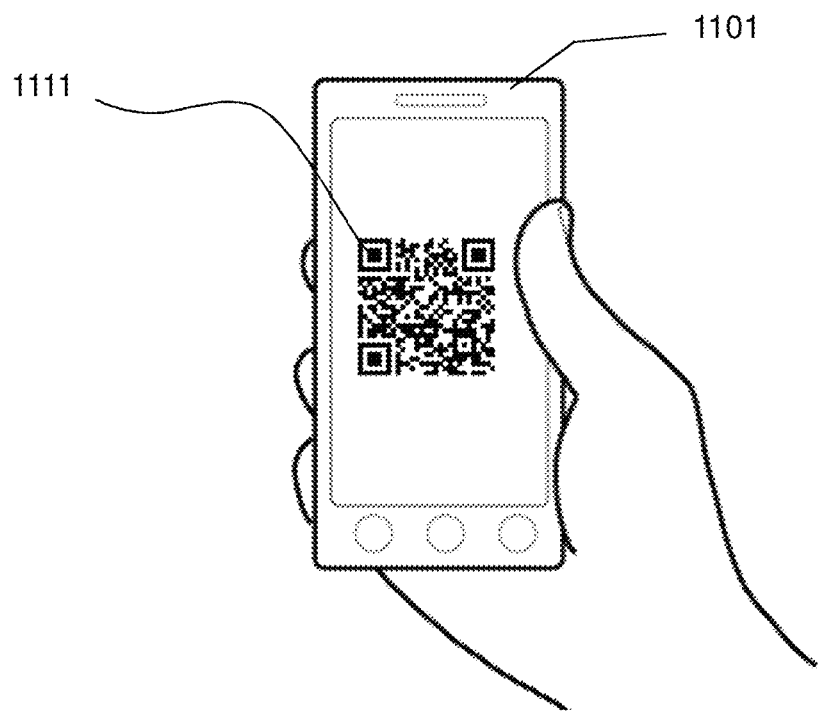
FIG. 11 is an example smartphone application for selecting a beverage product in accordance with user preferences, consistent with embodiments of this disclosure.

FIGS. 10 and 11 indicate various approaches for a user to interact with kiosk 100 or kiosk 100. In an example embodiment, kiosk 100 may be configured to present the user an interface (e.g., interface 120A) for allowing the user to choose various parameters of a plant-based beverage product. In an example embodiment, the user may choose a type of plant-based beverage product (e.g., almond milk, oatmeal-based milk, and the like). Additionally, the user may choose the "creaminess" of a plant-based beverage. As used herein, the term creaminess defines the ratio of base 10 to water 12 used for making the beverage. In some embodiments, the user may choose additives (e.g., vanilla, chocolate, etc.) for the beverage. FIG. 10 shows that kiosk 100 may include a button 1001 a touch screen 1002 containing graphical user interface (GUI) elements 1003 and 1005 or any other suitable means for controlling parameters of the dispensed beverage. In an example embodiment, element 1003 may be a type of a drink that can be selected by the user, and element 1005 may indicate to the user the page and the number of pages available for the user for selecting the beverage. Elements 1004A-1004C may be options for the beverage. For example, element 1004A may allow a user to select a maple syrup, element 1004B may allow the user to select vanilla syrup, and element 1004C may allow the user to select creaminess of plant-based milk. In various embodiments, elements 1004A-1004C may include bar elements 1005A-1005C for determining the amount of each product. In an example embodiment shown in FIG. 10, the user may choose only a small amount of vanilla syrup, as indicated by a short bar element 1005B. In various embodiments ranges for bar elements may be preset. For example, bar element 1005C may range, as an example embodiment, from 0.125 to 1, resulting in beverages with base-to-water ratios of 1/8 to 1. Similarly, suitable ranges may be established for various additives (e.g., maple syrup, sugar, chocolate, and the like).

FIG. 11 shown a mobile device 1101 (e.g., a smartphone, tablet, etc.) that may be used for selecting parameters of a beverage. In an example embodiment, mobile device 1101 may display a QR code 1111 that may contain information about parameters of the beverage. The QR code may be scanned by kiosk 100 to transmit parameters of the beverage to computing device 150 for the preparation of plant-based milk.

As previously described, computing device 150 may perform various function of controlling kiosk 100, and reporting operational data (e.g., data related to malfunction of kiosk 100, data related to usage of kiosk 100, data related to amount of supplies left in kiosk 100, or any other suitable kiosk 100 related data) to a kiosk dashboard. In various embodiments, kiosk 100 operational data may be communicated to kiosk dashboard over a suitable network (e.g., an Internet, and the like). In an example embodiment, the kiosk dashboard may be an internet site provided by a server residing in a cloud. The server may receive kiosk 100 operational data from computing device 150, process the data, and display the data on the kiosk dashboard. In an example embodiment, kiosk 100 operational data may include any suitable data related to malfunction of kiosk 100 (e.g., malfunctions of a refrigerator unit 193, a compressor 151, a motor 144, valves of mixing chamber 145, interface 120A (120B), blockage of various conduits, failure of a heater for heating water, leakage of water tanks 191 and 192, presence of residue in tanks 191 (192), smell of various components of kiosk 100, presence of contamination on surfaces as observed by kiosk internal cameras, presence of unusual noises, and the like). Additionally, as discussed above, computing device 150 may report amount of supplies (e.g., amount of base 10 and/or amount of purified water) available for kiosk 100 to the kiosk dashboard.

In some cases, computing device 150 may issue some informational messages to a user of kiosk 100. For example, computing device 150, through interface 120A, may inform the user that water is being chilled prior to dispensing a plant-based beverage, or that a mixing chamber is undergoing rinsing. In some cases, if kiosk 100 undergoes maintenance, interface 120A may inform the user about unavailability of a plant-based beverage.

In various embodiments, as shown in FIG. 1C, several containers (e.g., container 152 and 154) may be available for supplying base 10 for plant-based beverage. Computing device 150 may track the amount of base 10 left within containers 152 and 154 and inform the supplier when containers 152 and 154 need to be replaced. In an example embodiment, when container 152 is empty, computing device 150 may be configured to start using base 10 from container 154 and inform supplier that container 152 is empty and needs to be replaced. In some cases, computer device 150 may estimate the number of drinks that kiosk 100 may dispense before it completely runs out of base 10. In some cases, computing device 150 may estimate an amount of time left before kiosk 100 runs out of base 10. In various embodiments, computing device 150 may report variety of data related to the availability of supplies, as well as kiosk 100 malfunctions, to a kiosk dashboard that may be accessible by an administrator of kiosk 100 and a supplier of kiosk 100. In an example embodiment, the administrator of kiosk 100 may have a first set of permissions, and the supplier may have a second set of permissions for obtaining access to data of the kiosk dashboard. For example, the supplier of kiosk 100 may not have the permissions to have access data related to malfunctioning of kiosk 100.

For every dispensing transaction of kiosk 100, computing device 150 may produce a report and submit the report to the kiosk dashboard. The transaction report may include an amount of plant-based milk dispensed, a type of bottle used, a type of beverage dispensed, how much time it took to dispense the beverage, and/or any other suitable data related to dispensing plant-based beverage. Additionally, computing device 150 may report to the kiosk dashboard when a bottle is taken from a grab-and-go refrigerator section, as previously discussed.

In various embodiments, kiosk 100 may be designed to prevent incorrect connection of supplies (e.g., plant-based bases) in kiosk 100. For example, kiosk may have a first connector having a first receiving shape for connecting almond base, a second connector having a second receiving shape for connecting a cashew base, a third connector having a third receiving shape for connecting oatmeal paste, and so on. The first connector with the first receiving shape may accept only containers (e.g., containers 152, 154, as shown in FIG. 1C) having a corresponding first inserting shape, and may not accept any other inserting shape. Similarly, the second connector with the second receiving shape may accept only a corresponding second inserting shape, the third connector with the third receiving shape may accept only a corresponding third inserting shape, and so on. In an alternative embodiment, connectors of kiosk 100 and enclosures containing different plant-based bases may be color-coded for correctly connecting the enclosures. Alternatively, there may be sensors that can check for color or tag that may be associated with the enclosures (e.g., the enclosures may have RFID tags, and kiosk 100 may have RFID sensors located in a vicinity of connections for connecting enclosures).

In various embodiments, computing device 150 may report run-time parameters of kiosk 100 (e.g., the temperature of purified water in water tanks 191 and 192, temperature of bases, and the like) to the kiosk dashboard. If run-time parameters are outside the norm, computing device 150 may report an error code.

In various embodiments, the administrator of kiosk 100 may remotely administer various aspects of operation of kiosk 100. For example, the administrator may adjust temperature for different components of kiosk 100, pressures for different valves, pressure within mixing chamber 145, parameters of motor 144, flow rates of various conduits, rotation of turntable 411, as shown in FIG. 4A, or any other parameters that are controlled by computing device 150. For example, the administrator may remotely open/close doors of kiosk 100. In some cases, an administrator may communicate with supplier of kiosk 100 to resupply kiosk 100. In some cases, the supplier may remotely adjust at least some parameters of kiosk 100. In various embodiments, kiosk 100 may have several suppliers with different responsibilities and different information available to them via kiosk dashboard. For example, a first supplier may be a supplier for plant-based bases, and a second supplier may be a supplier of cleaning and sanitizing agents for kiosk 100. A third supplier may be a mechanic for providing new parts for kiosk 100 and for configuring various components of kiosk 100.

Consistent with disclosed embodiments, a system for dispensing a plant-based milk may include a mixing chamber configured to emulsify a plant-based paste and water, as previously described. The system may include a plant-based paste storage (e.g., containers 152 and 154, as shown in FIG. 1C) connected to the mixing chamber via a first conduit (e.g., outlet connection 140A1, as shown in FIG. 1C), a water storage (e.g., tank 191, as shown in FIG. 1H) connected to the mixing chamber (e.g., chamber 145) via a second conduit and a cooling system (e.g., system 193). The cooling system may be configured to cool water within the water storage to a first prescribed temperature (e.g., to a near-freezing temperature, or any other suitable temperature) and to cool contents of the mixing chamber to a second prescribed temperature (e.g., to a near-freezing temperature, or any other suitable temperature). Further, the system may include a pumping system configured to move a prescribed amount of the plant-based paste into the mixing chamber upon receiving an input from a user via a user interface. The prescribed amount of the plant-based paste may be an amount that is needed to form a plant-based milk of a desired creaminess and volume. The system may also include a flow system configured for flowing water from the water storage to the mixing chamber. Further the system may include a control system. The control system may be configured to receive the input from the user, activate the pumping system to move the prescribed amount of the plant-based paste into the mixing chamber, based on the input from the user, and activate the flow system to flow an amount of water into the mixing chamber, the amount of water corresponding to the prescribed amount of the plant-based paste. Further, the control system may be configured to activate the mixing chamber for emulsifying the plant-based paste and the water, and dispense the emulsified plant-based mixture of the paste and the water.

The foregoing description has been presented for purposes of illustration. It is not exhaustive and is not limited to precise forms or embodiments disclosed. Modifications and adaptations of the embodiments will be apparent from a consideration of the specification and practice of the disclosed embodiments. For example, while certain components have been described as being coupled to one another, such components may be integrated with one another or distributed in any suitable fashion.

Moreover, while illustrative embodiments have been described herein, the scope includes any and all embodiments having equivalent elements, modifications, omissions, combinations (e.g., of aspects across various embodiments), adaptations and/or alterations based on the present disclosure. The elements in the claims are to be interpreted broadly based on the language employed in the claims and not limited to examples described in the present specification or during the prosecution of the application, which examples are to be construed as nonexclusive. Further, the steps of the disclosed methods can be modified in any manner, including reordering steps and/or inserting or deleting steps.

The features and advantages of the disclosure are apparent from the detailed specification, and thus, it is intended that the appended claims cover all systems and methods falling within the true spirit and scope of the disclosure. As used herein, the indefinite articles "a" and "an" mean "one or more." Similarly, the use of a plural term does not necessarily denote a plurality unless it is unambiguous in the given context. Words such as "and" or "or" mean "and/or" unless specifically directed otherwise. Further, since numerous modifications and variations will readily occur from studying the present disclosure, it is not desired to limit the disclosure to the exact construction and operation illustrated and described, and accordingly, all suitable modifications and equivalents may be resorted to, falling within the scope of the disclosure. As used herein, unless otherwise noted, the term "set" means one or more (i.e., at least one), and the phrase "any solution" means any now known or later developed solution. Other embodiments will be apparent from a consideration of the specification and practice of the embodiments disclosed herein. It is intended that the specification and examples be considered as an example only, with a true scope and spirit of the disclosed embodiments being indicated by the following claims.

What is claimed is:

1. A system for dispensing a plant-based milk comprising:
   a mixing chamber configured to emulsify a plant-based paste and water;
   a plant-based paste storage connected to the mixing chamber via a first conduit;
   a water storage tank connected to the mixing chamber via a second conduit;

a cooling system configured to:
  cool water within the water storage tank to a first prescribed temperature;
  cool contents of the mixing chamber to a second prescribed temperature;
a pumping system configured to move a prescribed amount of the plant-based paste into the mixing chamber upon receiving an input from a user via a user interface;
a flow system configured for flowing water from the water storage tank to the mixing chamber;
a clean-in-place system for cleaning the system; and
a control system configured to:
  receive the input from the user;
  activate the pumping system to move the prescribed amount of the plant-based paste into the mixing chamber, based on the input from the user;
  activate the flow system to flow an amount of water into the mixing chamber, the amount of water corresponding to the prescribed amount of the plant-based paste;
  activate the mixing chamber for emulsifying the plant-based paste and the water; and
  dispense the emulsified plant-based mixture of the paste and the water.

2. The system of claim 1, wherein control system is further configured to:
  activate the pumping system to pump the prescribed amount of paste into the mixing chamber;
  determine a weight of the mixing chamber;
  determine an amount of water that needs to be flown into the mixing chamber based on the determined weight of the mixing chamber; and
  activate the flow system to flow the determined amount of water into the mixing chamber.

3. The system of claim 1, wherein the system further includes an enclosure for placing a container.

4. The system of claim 3, wherein the system further includes a nozzle at a top portion of the enclosure configured to dispense the emulsified plant-based mixture into the container.

5. The system of claim 3, wherein the system further includes a sensor configured to detect the presence of the container in the enclosure.

6. The system of claim 3, wherein the enclosure further includes a region configured to collect spilled emulsified plant-based mixture.

7. The system of claim 3, wherein the system further includes an auxiliary nozzle at the top portion of the enclosure configured to dispense one or more additives into the container.

8. The system of claim 1, wherein the system further includes a left side configured to dispense a first type of beverage product and a right side configured to dispense a second type of beverage product.

9. The system of claim 1, wherein the system further includes a third conduit configured to transport used water to a sewer system.

10. The system of claim 1, wherein the plant-based paste storage comprises a first pouch containing the plant-based paste.

11. The system of claim 10, wherein the system further includes a moveable rotating roller activated by a motor to squeeze the plant-based paste from the first pouch.

12. The system of claim 10, wherein the first pouch containing the plant-based paste is placed within a second pouch.

13. The system of claim 12, wherein the system further includes a valve configured to pump a gas into the second pouch to squeeze the plant-based paste from the first pouch.

14. The system of claim 1, wherein the system further includes a valve connected to the first conduit configured to control a flow of the plant-based paste from the plant-based paste storage.

15. The system of claim 1, wherein the system further includes a heating system configured to heat water for use in the clean-in-place system.

16. The system of claim 1, wherein the system further includes a refrigeration section configured to contain a plurality of bottles containing a plurality of plant-based beverages.

17. The system of claim 1, wherein the mixing chamber further includes a mixing tool configured to mix the plant-based paste and the water.

18. The system of claim 1, wherein the mixing chamber further includes a pressure sensor configured to generate a pressure measurement signal based on the prescribed amount of the plant-based mixture in the mixing chamber.

19. The system of claim 1, wherein the system further includes a scale system configured to measure a weight of the plant-based paste and the water entering the mixing chamber.

20. The system of claim 1, wherein the control system is further configured to:
  track an amount of the plant-based paste in the plant-based paste storage; and
  notify a supplier when the amount of the plant-based paste is below a predetermined threshold.

* * * * *